United States Patent
Samuel et al.

(10) Patent No.: US 11,466,555 B2
(45) Date of Patent: Oct. 11, 2022

(54) METHOD AND CRITERIA FOR TRAJECTORY CONTROL

(71) Applicant: Halliburton Energy Services, Inc., Houston, TX (US)

(72) Inventors: Robello Samuel, Cypress, TX (US); Zhengchun Liu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/824,091

(22) Filed: Mar. 19, 2020

(65) Prior Publication Data
US 2021/0164333 A1 Jun. 3, 2021

Related U.S. Application Data

(63) Continuation of application No. 15/104,144, filed as application No. PCT/US2014/012950 on Jan. 24, 2014, now abandoned.

(51) Int. Cl.
*E21B 44/00* (2006.01)
*E21B 7/04* (2006.01)
(Continued)

(52) U.S. Cl.
CPC .............. *E21B 44/005* (2013.01); *E21B 7/04* (2013.01); *E21B 41/0092* (2013.01);
(Continued)

(58) Field of Classification Search
CPC .......... E21B 44/005; E21B 44/00; E21B 7/04; E21B 41/0092; E21B 47/06; E21B 47/07;
(Continued)

(56) References Cited

U.S. PATENT DOCUMENTS 6,101,444 A * 8/2000 Stoner ..................... E21B 44/00
702/9
7,866,403 B1 * 1/2011 Borgstadt .............. E21B 19/086
166/379
(Continued)

FOREIGN PATENT DOCUMENTS

EP 2392978 B1 7/2013

OTHER PUBLICATIONS

Liu Zhengchum, "Wellbore Trajectory Control Based on Minimum Well Profile Energy for Drilling Automation", Dec. 2013, pp. 1-61 (Year: 2013).*

(Continued)

*Primary Examiner* — Manuel A Rivera Vargas
*Assistant Examiner* — Yaritza H Perez Bermudez
(74) *Attorney, Agent, or Firm* — Kilpatrick Townsend & Stockton LLP

(57) ABSTRACT

The disclosed embodiments include a method, apparatus, and computer program product configured to performing automated downhole wellbore trajectory control for correcting between an actual wellbore trajectory path and a planned wellbore trajectory path. For example, in one embodiment, a PID controller is configured to obtain real-time data gathered during the drilling operation, determine whether the actual wellbore trajectory path deviates from the planned wellbore trajectory path, and automatically initiate the downhole wellbore trajectory control to change the actual wellbore trajectory path to a modified correction path that is determined using a minimum incremental wellbore energy method.

20 Claims, 12 Drawing Sheets

(51) Int. Cl.
*E21B 41/00* (2006.01)
*E21B 47/022* (2012.01)
*G05B 11/36* (2006.01)
*E21B 47/07* (2012.01)
*E21B 47/06* (2012.01)
*E21B 47/12* (2012.01)
*E21B 49/00* (2006.01)

(52) U.S. Cl.
CPC ............ *E21B 44/00* (2013.01); *E21B 47/022* (2013.01); *G05B 11/36* (2013.01); *E21B 47/06* (2013.01); *E21B 47/07* (2020.05); *E21B 47/12* (2013.01); *E21B 49/00* (2013.01)

(58) Field of Classification Search
CPC ........ E21B 47/022; E21B 47/12; E21B 49/00; G05B 11/36
See application file for complete search history.

(56) References Cited

U.S. PATENT DOCUMENTS

| | | | |
|---|---|---|---|
| 7,957,946 | B2 | 6/2011 | Pirovolou |
| 9,970,284 | B2* | 5/2018 | Tang ........................ E21B 44/00 |
| 10,883,360 | B2* | 1/2021 | Samuel ................ E21B 47/022 |
| 2003/0034178 | A1* | 2/2003 | Cargill .................... E21B 7/067 175/73 |
| 2004/0050590 | A1* | 3/2004 | Pirovolou ................ E21B 7/04 175/61 |
| 2004/0231893 | A1 | 11/2004 | Kent |
| 2008/0314641 | A1* | 12/2008 | McClard .................... E21B 7/04 175/57 |
| 2009/0000823 | A1* | 1/2009 | Pirovolou ................ E21B 7/04 175/61 |
| 2009/0065258 | A1* | 3/2009 | Hamilton .................. E21B 7/06 175/61 |
| 2009/0090555 | A1* | 4/2009 | Boone ..................... E21B 44/02 175/45 |
| 2009/0319241 | A1* | 12/2009 | Samuel ..................... E21B 7/04 703/10 |
| 2010/0089584 | A1* | 4/2010 | Burns ...................... H01C 3/00 166/302 |
| 2013/0146358 | A1* | 6/2013 | DiSantis ................... E21B 7/00 175/27 |
| 2014/0049401 | A1* | 2/2014 | Tang ........................ E21B 7/04 340/853.6 |
| 2015/0167392 | A1* | 6/2015 | Sugiura ..................... E21B 7/04 175/45 |
| 2015/0369042 | A1* | 12/2015 | Samuel ................ E21B 49/003 702/9 |

OTHER PUBLICATIONS

Liu Zhengchun, Wellbore Trajectory Control Based on Minimum Well Profile Energy for Drilling Automation, A Thesis Presented to The Faculty of the Department of Petroleum Engineering University of Houston, Dec. 2013, 72 pages, Houston, Texas.

* cited by examiner

METHOD AND CRITERIA FOR TRAJECTORY CONTROL

CROSS REFERENCE TO RELATED APPLICATIONS

The present application is a Continuation of U.S. patent application Ser. No. 15/104,144, filed Jun. 13, 2016, which is a National Stage patent application of International Patent Application No. PCT/US2014/012950 filed on Jan. 24, 2014, the benefit of each of which is claimed and the disclosure of each is incorporated herein by reference in its entirety.

BACKGROUND OF THE INVENTION

1. Field of the Invention

The invention relates generally to methods of directionally drilling wells, particularly wells for the production of hydrocarbon products. More specifically, it relates to methods and systems for performing automated control of a steerable drilling tool to drill wells along a planned trajectory.

2. Discussion of the Related Art

At the beginning of a drilling operation, drillers typically establish a drilling plan that includes a target location and a drilling path to the target location. During the drilling operation, it is not uncommon that the actual wellbore trajectory deviates from the designed well path due to unexpected reasons. Action must be taken to bring the wellbore trajectory back to the desired path. This deviation correction mechanism is extremely important for any drilling operation.

BRIEF DESCRIPTION OF THE DRAWINGS

Illustrative embodiments of the present invention are described in detail below with reference to the attached drawing figures, which are incorporated by reference herein and wherein.

The illustrated figures are only exemplary and are not intended to assert or imply any limitation with regard to the environment, architecture, design, or process in which different embodiments may be implemented.

DETAILED DESCRIPTION

Figure 1:
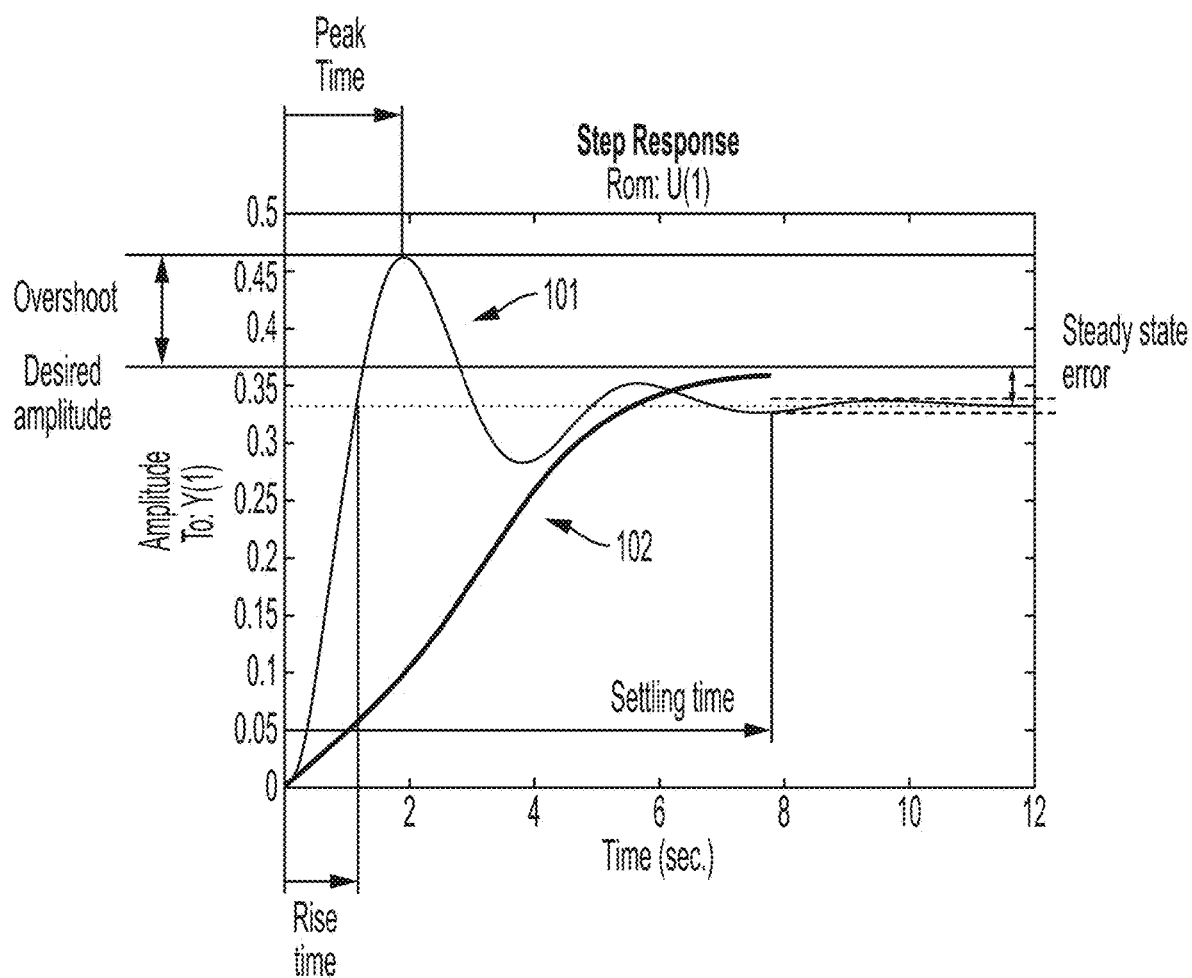
FIG. 1 is a diagram illustrating the feedback signal of a proportional-integral-derivative (PID) controller for wellbore trajectory control in accordance with a disclosed embodiment.

As stated above, during the drilling process, it is not uncommon that the actual wellbore trajectory deviates from the designed well path due to unexpected reasons. Currently, conventional wellbore trajectory control method use a proportional-integral-derivative (PID) controller for wellbore trajectory control. A PID controller calculates an "error" value as the difference between a measured process variable and a desired setpoint. The controller attempts to minimize the error by adjusting the process control outputs. In a PID method, the feedback signal is a function with proportional, integral, and derivative parts. The signal usually fluctuates before it returns to the desired value as indicated by signal 101 in FIG. 1. In order to achieve a smooth signal correction 102, as indicated in FIG. 1, the coefficients of the proportional, integral, and derivative parts have to be carefully tuned. In down-hole drilling, it is desired to avoid the trajectory fluctuation. However, it is difficult to realize or achieve the smooth control signal 102 using the PID method because the pre-tuned coefficients may not work due to the changing down-hole operation conditions.

Accordingly, the disclosed embodiments present a system, computer-implemented method, and computer program product that modifies the conventional PID controller to implement a minimum wellbore energy method for performing automated downhole wellbore trajectory control for correcting between an actual wellbore trajectory path and a planned wellbore trajectory path.

In accordance with the disclosed embodiments, information gathering may be performed using tools that are delivered downhole via wireline or alternatively using tools that are coupled to or integrated into a drill string of a drilling rig. As will be further described below in referenced to the figures, wireline-delivered tools are suspended from a wireline that is electrically connected to control and logging equipment at the surface of the well. The tools may be deployed by first removing the drill string and then lowering the wireline and tools to an area of interest within the formation. This type of testing and measurement is often referred to as "wireline formation testing (WFT)." The tools associated with WFT may be used to measure pressure and temperature of formation and wellbore fluids.

In certain embodiments, instead of wireline deployment, measurement tools are coupled to or integrated with the drill string. In these situations, the added expense and time of removing the drill string prior to measurement of important formation properties is avoided. This process of "measurement while drilling (MWD)" uses measurement tools to determine formation and wellbore temperatures and pressures, as well as the trajectory and location of the drill bit. The process of "logging while drilling (LWD)" uses tools to determine additional formation properties such as permeability, porosity, resistivity, and other properties. The information obtained by MWD and LWD enable real-time decisions to be made to alter ongoing drilling operations.

Figure 2:
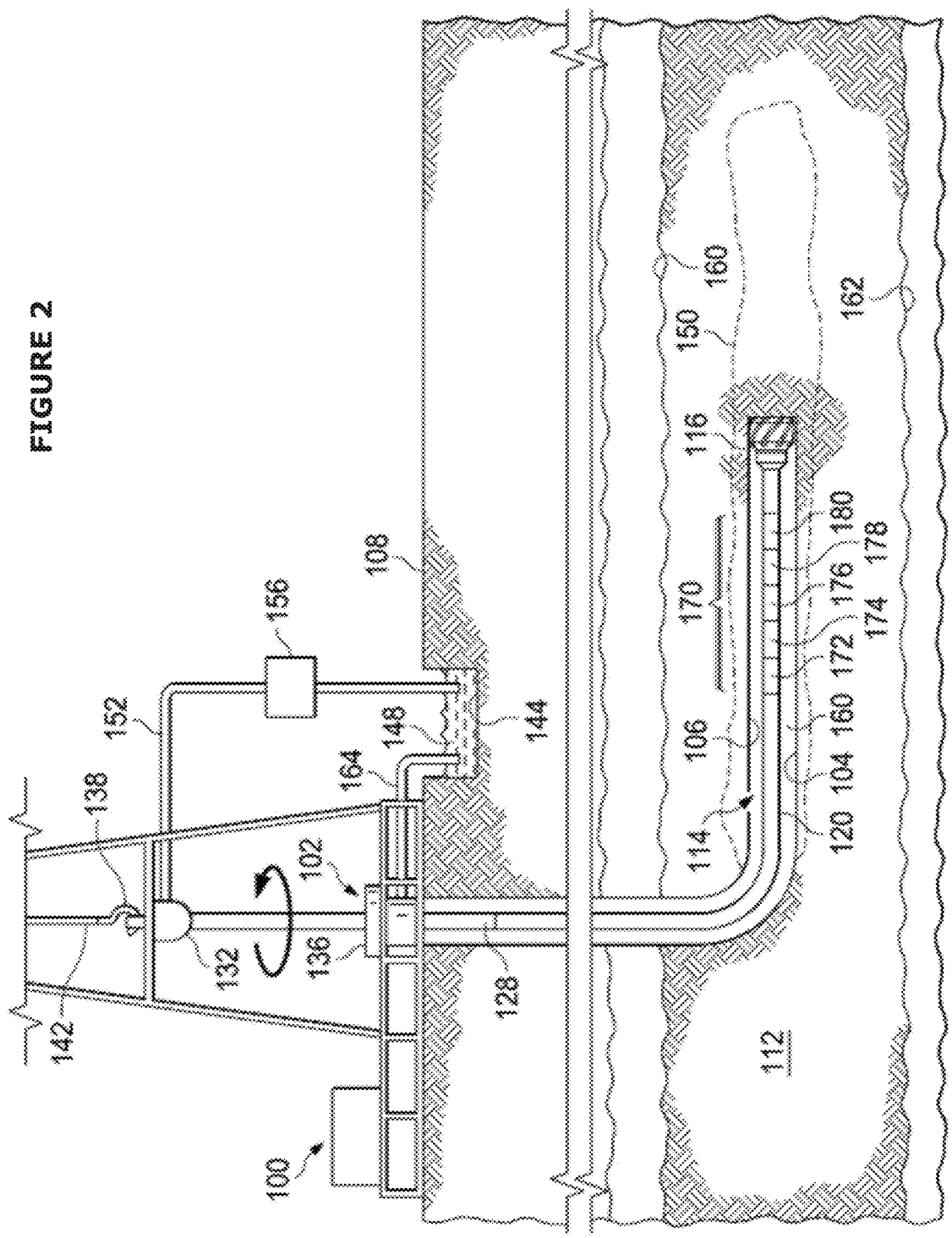
FIG. 2 illustrates a schematic view of a well that utilizes a measurement while drilling assembly for determining real-time path data in accordance with a disclosed embodiment.
Figure 3:
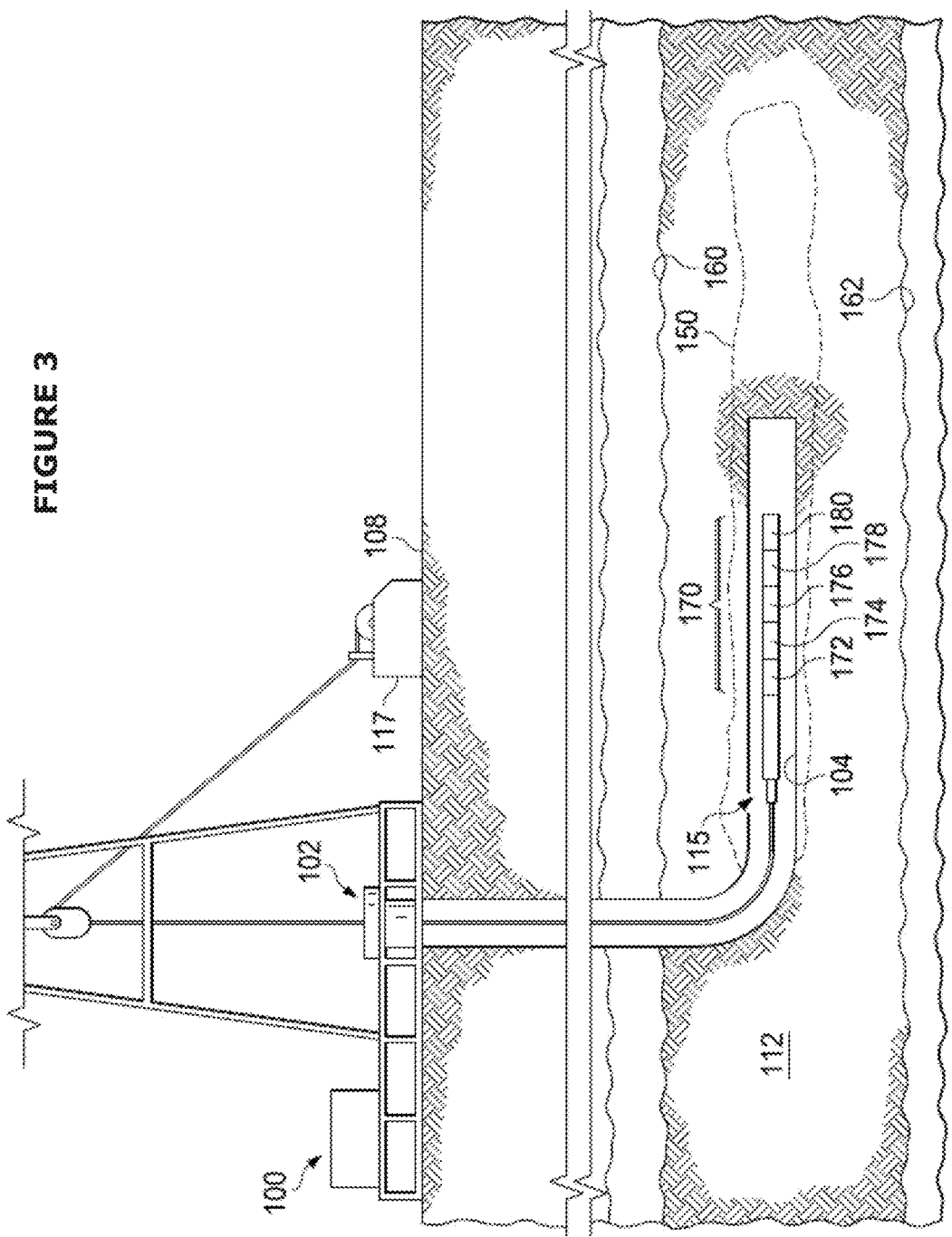
FIG. 3 illustrates a schematic view of a well that has a wireline or wireline formation testing assembly for determining real-time path data in accordance with a disclosed embodiment.
Figure 4:
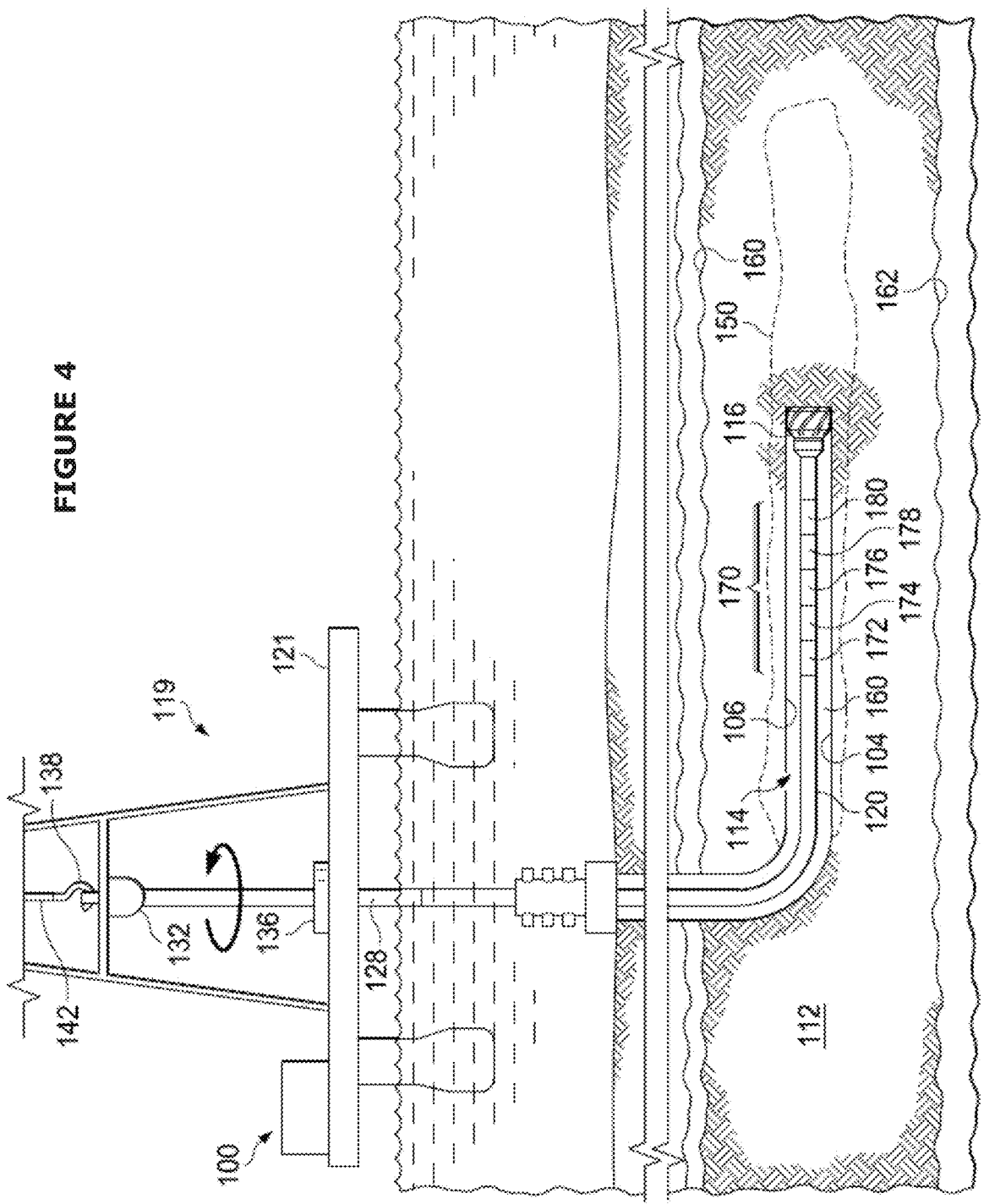
FIG. 4 illustrates a schematic view of a subsea well that utilizes a logging while drilling assembly for determining real-time path data in accordance with a disclosed embodiment.

FIGS. 2-4 illustrates several example embodiments of well systems in which the disclosed embodiments may be utilized. For instance, beginning with FIG. 2, a schematic view of a well 102 that utilizes a measurement while drilling assembly for determining real-time path data in accordance with a disclosed embodiment is presented. In the depicted embodiment, the well 102 is illustrated onshore with a set of measurement tools 170 being deployed in a bottom hole assembly (BHA) 114. The well 102 includes a wellbore 104 that extends from a surface 108 of the well 102 to or through a subterranean formation 112. The well 102 is formed by a drilling process, in which a drill bit 116 is turned by a drill string 120 that extends from the drill bit 116 to the surface 108 of the well 102. The drill string 120 may be made up of one or more connected tubes or pipes, of varying or similar cross-section. The drill string may refer to the collection of pipes or tubes as a single component, or alternatively to the individual pipes or tubes that comprise the string. The term drill string is not meant to be limiting in nature and may refer to any component or components that are capable of transferring rotational energy from the surface of the well to the drill bit. In several embodiments, the drill string 120 may include a central passage disposed longitudinally in the drill string and capable of allowing fluid communication between the surface of the well and downhole locations.

At or near the surface 108 of the well, the drill string 120 may include or be coupled to a kelly 128. The kelly 128 may have a square, hexagonal or octagonal cross-section. The kelly 128 is connected at one end to the remainder of the drill string and at an opposite end to a rotary swivel 132. The kelly passes through a rotary table 136 that is capable of rotating the kelly and thus the remainder of the drill string 120 and drill bit 116. The rotary swivel 132 allows the kelly 128 to rotate without rotational motion being imparted to the rotary swivel 132. A hook 138, cable 142, traveling block (not shown), and hoist (not shown) are provided to lift or lower the drill bit 116, drill string 120, kelly 128 and rotary swivel 132. The kelly and swivel may be raised or lowered as needed to add additional sections of tubing to the drill string 120 as the drill bit 116 advances, or to remove sections of tubing from the drill string 120 if removal of the drill string 120 and drill bit 116 from the well 102 are desired.

A reservoir 144 is positioned at the surface 108 and holds drilling mud 148 for delivery to the well 102 during drilling operations. A supply line 152 is fluidly coupled between the reservoir 144 and the inner passage of the drill string 120. A pump 156 drives fluid through the supply line 152 and downhole to lubricate the drill bit 116 during drilling and to carry cuttings from the drilling process back to the surface 108. After traveling downhole, the drilling mud 148 returns to the surface 108 by way of an annulus 160 formed between the drill string 120 and the wellbore 104. At the surface 108, the drilling mud 148 is returned to the reservoir 144 through a return line 164. The drilling mud 148 may be filtered or otherwise processed prior to recirculation through the well 102.

In one embodiment, the set of measurement tools 170 is positioned downhole to measure, process, and communicate data regarding the physical properties of the subterranean formation 112 such as, but not limited to, permeability, porosity, resistivity, and other properties. The measurement tools 170 may also provide information about the drilling process or other operations occurring downhole. In some embodiments, the data measured and collected by the set of measurement tools 170 may include, without limitation, pressure, temperature, flow, acceleration (seismic and acoustic), strain data, and location and trajectory data of a drill bit 116.

The set of measurement tools 170 may include a plurality of tool components that are coupled to one another by threads, couplings, welds, or other means. In the illustrative embodiment depicted in FIG. 3, the set of measurement tools 170 includes a transceiver unit 172, a power unit 174, a sensor unit 176, a pump unit 178, and a sample unit 180. Each of the individual components may include control electronics such as processor devices, memory devices, data storage devices, and communications devices, or alternatively a centralized control unit may be provided that communicates with and controls one or more of the individual components.

The transceiver unit 172 is capable of communicating with the control system 100 or similar equipment at or near the surface 108 of the well 102. Communication between the transceiver unit 172 and the control system 100 may be by wire if the drill string 120 is wired or if a wireline evaluation system is deployed. Alternatively, the transceiver unit 172 and control system 100 may communicate wirelessly using mud pulse telemetry, electromagnetic telemetry, or any other suitable communication method. Data transmitted by the transceiver unit 172 may include without limitation sensor data or other information, as described above, measured by the various components of the set of measurement tools 170.

The power unit 174 may be hydraulically powered by fluid circulated through the well or by fluid circulated or pressurized in a downhole, closed-loop hydraulic circuit. Alternatively, the power unit 174 may be an electrical power unit, an electro-mechanical power unit, a pneumatic power unit, or any other type of power unit that is capable of harnessing energy for transfer to powered devices. The power unit 174 may provide power to one or more of the components associated with the set of measurement tools 170, or alternatively to one or more other downhole devices. For example, in some embodiments, the power unit 174 may provide power to the pump unit 178. A pump associated with the pump unit 178 may be used to move fluids within or between the components of the set of measurement tools 170 as explained in more detail below.

The sensor unit 176 may also receive power from the power unit 174 and may contain a number of sensors such as pressure sensors, temperature sensors, seismic sensors, acoustic sensors, strain gauges, inclinometers, or other sensors. Additionally, the sample unit 180 may gather samples of the subterranean formation 112 or reservoir fluids (typically hydrocarbons) for enabling further evaluation of the drilling operations and production potential.

As will be further described, the information gathered by the set of measurement tools 170 during the drilling process allows the control system 100 to update a probability model for automatically making adjustments in a drill path.

While the set of measurement tools 170 is illustrated as a part of the drill string 120 in FIG. 2, in other embodiments, as depicted in FIG. 3, the set of measurement tools 170 may be lowered into the well by wireline either through the central passage of the drill string 120, or if the drill string 120 is not present, directly through the wellbore 104. In this embodiment, set of measurement tools 170 may instead be deployed as part of a wireline assembly either onshore or off-shore. The wireline assembly 115 includes a winch 117 to lift and lower a downhole portion of the wireline assembly 115 into the well.

In still another embodiment, as depicted in FIG. 4, the control system 100 and the set of measurement tools 170 may similarly be deployed in a sub-sea well 119 accessed by a fixed or floating platform 121.

Figure 5:
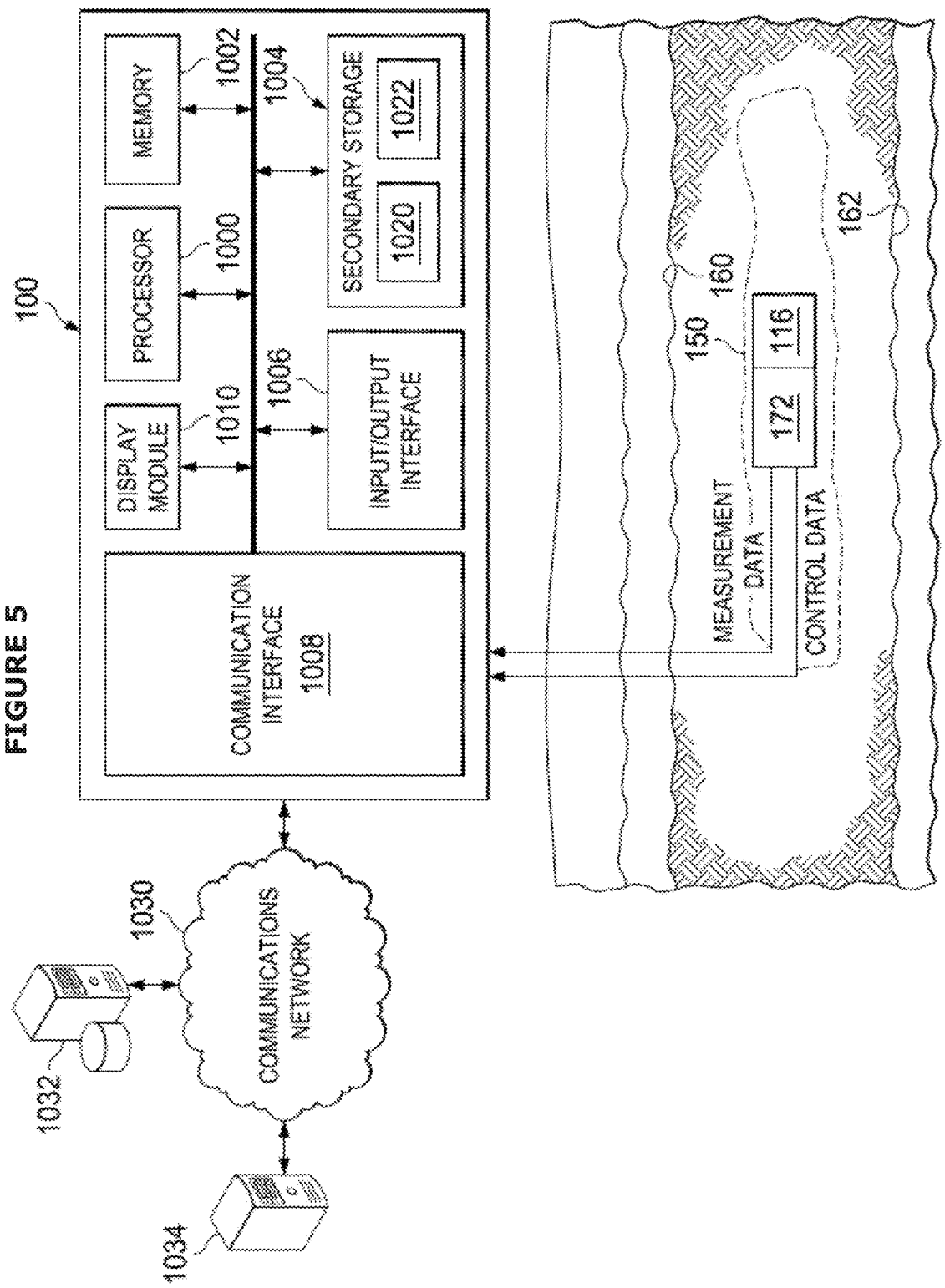
FIG. 5 is a block diagram illustrating one embodiment of a system for implementing the disclosed embodiments.

FIG. 5 is a block diagram illustrating one embodiment of the control system 100 for implementing the features and functions of the disclosed embodiments. The control system 100 includes, among other components, a processor 1000, memory 1002, secondary storage unit 1004, an input/output interface module 1006, and a communication interface module 1008. The processor 1000 may be any type or any number of single core or multi-core processors capable of executing instructions for performing the features and functions of the disclosed embodiments.

The input/output interface module 1006 enables the control system 100 to receive user input (e.g., from a keyboard and mouse) and output information to one or more devices such as, but not limited to, printers, external data storage devices, and audio speakers. The control system 100 may optionally include a separate display module 1010 to enable information to be displayed on an integrated or external display device. For instance, the display module 1010 may include instructions or hardware (e.g., a graphics card or chip) for providing enhanced graphics, touchscreen, and/or multi-touch functionalities associated with one or more display devices.

Main memory 1002 is volatile memory that stores currently executing instructions/data or instructions/data that are prefetched for execution. The secondary storage unit 1004 is non-volatile memory for storing persistent data. The secondary storage unit 1004 may be or include any type of internal or external data storage component such as a hard drive, a flash drive, or a memory card. In one embodiment, the secondary storage unit 1004 stores the computer executable code/instructions and other relevant data for enabling a user to perform the features and functions of the disclosed embodiments.

For example, in accordance with the disclosed embodiments, the secondary storage unit 1004 may permanently store, among other data, the executable code/instructions of an automated downhole wellbore trajectory control algorithm 1020 as will be further described herein. The instructions associated with the automated downhole wellbore trajectory control algorithm 1020 are loaded from the secondary storage unit 1004 to main memory 1002 during execution by the processor 1000 for performing the features of the disclosed embodiments. In some embodiments, the secondary storage unit 1004 may also include executable code/instructions associated with a formation/reservoir modeling application, such as, but not limited to, Decision-Space® Earth Modeling software 1022 available from Landmark Graphics Corporation for assisting in controlling the wellbore trajectory.

The communication interface module 1008 enables the control system 100 to communicate with the communications network 1030. For example, the network interface module 1008 may include a network interface card and/or a wireless transceiver for enabling the control system 100 to send and receive data through the communications network 1030 and/or directly with other devices.

The communications network 1030 may be any type of network including a combination of one or more of the following networks: a wide area network, a local area network, one or more private networks, the Internet, a telephone network such as the public switched telephone network (PSTN), one or more cellular networks, and wireless data networks. The communications network 1030 may include a plurality of network nodes (not depicted) such as routers, network access points/gateways, switches, DNS servers, proxy servers, and other network nodes for assisting in routing of data/communications between devices.

For example, in one embodiment, the control system 100 may interact with one or more servers 1034 or databases 1032 for performing the features of the disclosed embodiments. For instance, the control system 100 may query the database 1032 for well log information or other geophysical data for generating an initial model of a formation and reservoir in accordance with the disclosed embodiments. Further, in certain embodiments, the control system 100 may act as a server system for one or more client devices or a peer system for peer to peer communications or parallel processing with one or more devices/computing systems (e.g., clusters, grids).

In addition, control system 100 may communicate data to the transceiver unit 172 such as control data to direct the operation of the various components of the set of measurement tools 170 and/or to alter direction of the drill path based on a change in a probability model in accordance with the disclosed embodiments. As described above, the control system 100 is also configured to receive real-time measurement data for the set of measurement tools 170 during the drilling process for performing the automated downhole wellbore trajectory control as described herein.

Still, in certain embodiments, the communication path between the control system 100 and the transceiver unit 172 may involve one or more middleware devices. For instance, in some embodiments, the control system 100 may be a remote system that communicates with a local system located at a well site over the communications network 1030, the local system being in direct communication with the transceiver unit 172. In other embodiments, the transceiver unit 172 may be in direct communication with one or more devices located on the communications network 1030 as opposed to communicating with a local system at the well site.

Figure 6:
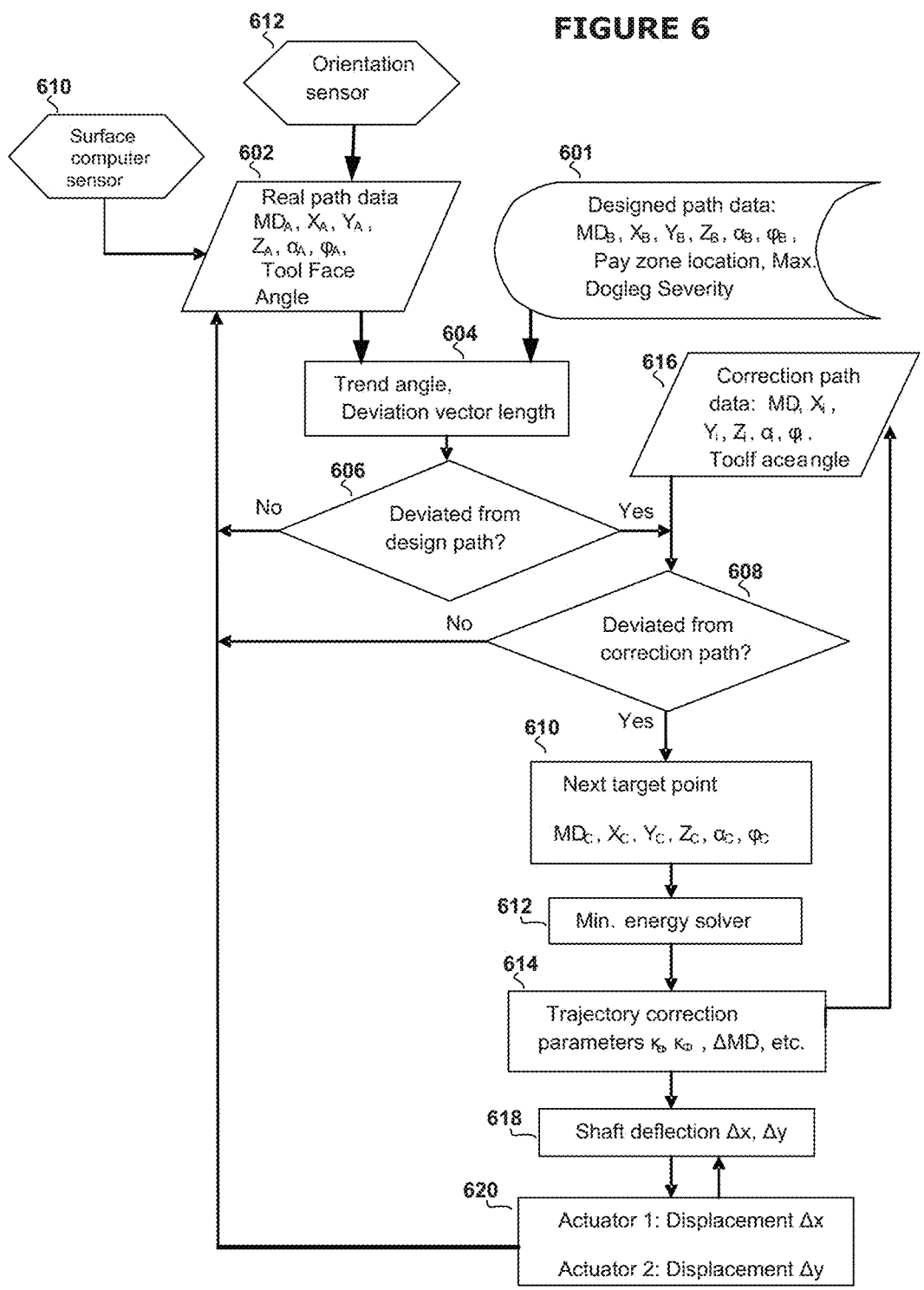
FIG. 6 is a flow diagram depicting a computer-implemented method for performing automated trajectory control in accordance with the disclosed embodiments.

With reference now to FIG. 6, a flow diagram is presented that illustrates an embodiment of a computer-implemented process 600 for performing automated downhole wellbore trajectory control for correcting between an actual wellbore trajectory path and a planned wellbore trajectory path. The computer-implemented process 600 may be implemented by a control system as described above or by a PID controller having memory, logic, and at least one processor for executing instructions that performs the operations of the computer-implemented process 600.

The process 600 begins at step 602 receives real-time path data from the surface computer sensor(s) 610 and orientation sensor(s) 612 as described above in reference to FIGS. 2-5. Examples of the real-time path data that is received includes, but is not limited to, measured depth ($MD_A$), horizontal departure along south-north direction ($X_A$), horizontal departure along west-east direction ($Y_A$), true vertical depth ($Z_A$), inclination angle ($\alpha_A$), azimuth angle ($\varphi_A$), and tool face angle. The subscript $_A$ indicates that the parameters are taken at position/location A. In addition, the process at step 601 receives the parameters/data of the designed path including, but not limited to, $MD_B$, $X_B$, $Y_B$, $Z_B$, $\alpha_B$, $\varphi_B$, pay zone location, and maximum dogleg severity. The subscript $_B$ indicates that the parameters refer to position B.

Figure 7:
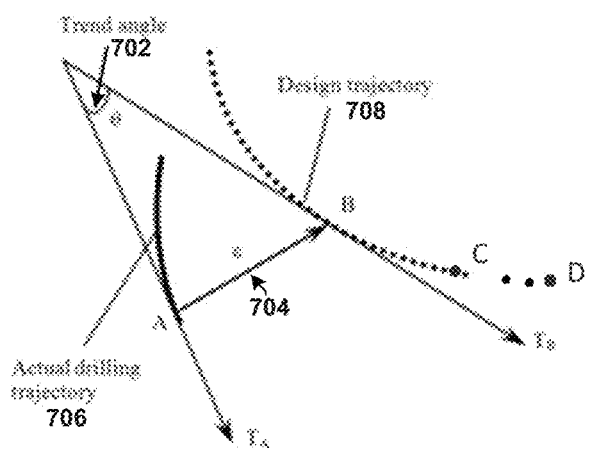
FIG. 7 is a diagram depicting a trend angle and a deviation vector length between an actual drilling path and a design drilling path in accordance with the disclosed embodiments.

At step 604, the process determines a trend angle 702 and a deviation vector length 704. as illustrated in FIG. 7 between the actual drilling path/trajectory 706 and the design drilling path/trajectory 708. The process at step 606 determines based on the trend angle 702 and the deviation vector length 704 whether the actual drilling path 706 has deviated from the design drilling path 708. For instance, in certain embodiments, a deviation threshold parameter may be set by a drilling operator to determine whether the actual drilling path 706 has deviated from the design drilling path 708.

If the process determines that the actual drilling path 706 has not deviated from the design drilling path 708, the process returns to step 602 and repeats the process with updated real-time drill path data. However, if the process determines that the actual drilling path 706 has deviated from the design drilling path 708, the process determines at step 608 whether the actual drilling path 706 has deviated from a correction path. A correction path is a path previously determined by the process that would bring the actual drilling path 706 back in line with the design drilling path 708. If the process determines that the actual drilling path 706 has not deviated from a correction path, the process returns to step 602 and repeats the process with updated real-time drill path data.

However, if the process determines that either the actual drilling path 706 has deviated from a correction path or that the actual drilling path 706 is not currently on a correction path (e.g., this would occur when the process previously considered the actual drilling path 706 to be aligned with the design drilling path 708), the process at step 610 determines a target point along the design drilling path 708 for determining a correction path. In one embodiment, the process determines the following parameters for a target point at location C: $MD_C$, $X_C$, $Y_C$, $Z_C$, $\alpha_C$, and $\varphi_C$ as described above. In one embodiment, the target point for a trajectory correction can be determined using the maximum allowable dogleg severity and other limitations. For example, if the maximum added dogleg severity is 2°/100 ft and the current orientation angle error, i.e., trend angle is 6°, then the process determines that at least 300 ft is needed to correct the wellbore orientation. However, to correct orientation is not enough. The process also corrects the position error ε. For example, assuming that the position error is small, the process may determine that the new target needs to be ~900 ft ahead of the current location in the designed trajectory.

Figure 8:
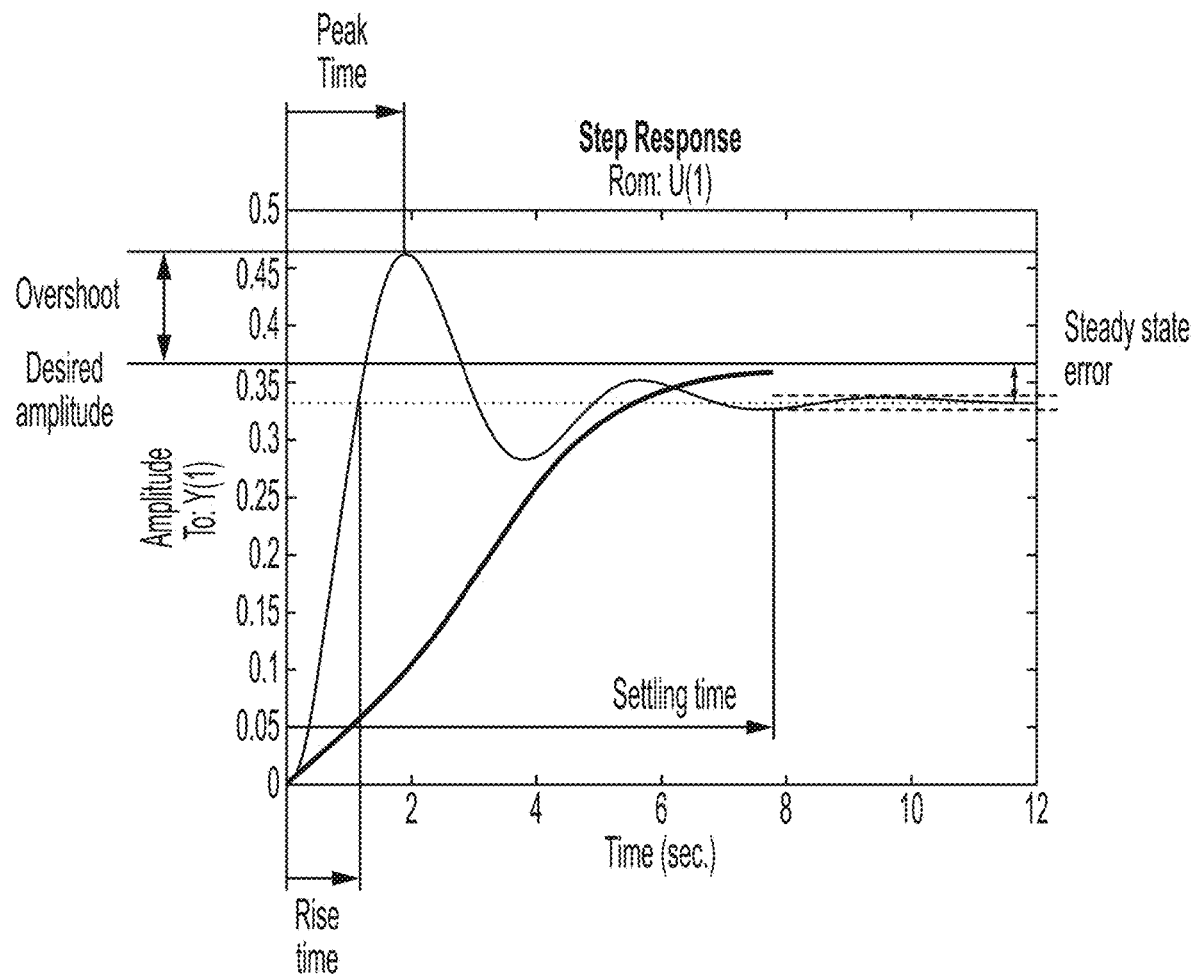
FIG. 8 is a diagram depicting the sections of a retuning/correction path of the feedback signal of a PID controller for wellbore trajectory control in accordance with the disclosed embodiments.

Once the process determines the next target point, the process executes, at step 612, a minimum energy algorithm/solver to determine the parameters of a correction path that has a minimum incremental wellbore energy. This step could be implemented using a number of methods including, but not limited to, the balanced tangential method, the minimum curvature method, and the natural curve method. For example, assuming trajectory correction starts at the beginning of $\Delta D_{n-1}$ section, as shown in FIG. 8, the normalized wellbore energy is determined based on the following equations:

$$E_{(abs)n} = \frac{\sum_{i=1}^{n}(\kappa_i^2 + \tau_i^2)\Delta D_i}{D_n + \Delta D_n} =$$

$$\frac{\sum_{i=1}^{n-1}(\kappa_i^2 + \tau_i^2)\Delta D_i + (\kappa_{n-1}^2 + \tau_{n-1}^2)\Delta D_{n-1} + (\kappa_n^2 + \tau_n^2)\Delta D_n}{D_n + \Delta D_n}$$

$$\tau_i = \frac{\kappa_{\alpha i}\dot{\kappa}_{\varphi i} - \kappa_{\varphi i}\dot{\kappa}_{\alpha i}}{\kappa_i^2}\sin\alpha_i + \kappa_{\varphi i}\left(1 + \frac{\kappa_{\alpha i}^2}{\kappa_i^2}\right)\cos\alpha_i$$

$$\kappa_i =$$

$$\beta/\Delta D_i = \arccos(\cos\Delta\phi_i\sin\alpha_{i-1}\sin\alpha_i + \cos\alpha_i\cos\alpha_{i-1})/\Delta D_i \text{ or } \kappa_i = $$

$$\sqrt{\kappa_{\alpha i}^2 + \kappa_{\phi i}^2\sin^2\alpha_i}$$

$$\alpha_i = \alpha_{i-1} + \kappa_{\alpha i}\Delta D_i, \Delta\phi_i = \kappa_{\phi i}\Delta D_i$$

for $i = 1, 2, \ldots, n-2$, where $\kappa_{\alpha i}$ and $k_{\phi i}$ are known.

for $i = n-1, n, \Delta D_i, \kappa_{\alpha i}$ and $\kappa_{\phi i}$ are unknown.

Where $D_i$ is the measured depth, $\alpha_{i-1}$ is the inclination angle, $\alpha_i$ is the new inclination angle, $\beta$ is the overall angle change, $\kappa$ is the wellbore curvature, $\tau$ is the borehole torsion, $\Delta\varphi$ is change of azimuth, $\kappa_\alpha$ is rate of inclination change, $\kappa_\varphi$ is the rate of azimuth change. Assuming derivatives of $\kappa_\alpha$ and $\kappa_\varphi$ are zero, the returning path consists of two arcs forming an S-shape curve.

In one embodiment, if the process implements the balanced tangential method for wellbore trajectory calculation, the follow equations are used to determine the parameters of a correction path that has a minimum incremental wellbore energy:

$$\kappa_{\alpha n-1}\Delta D_{n-1} + \kappa_{\alpha n}\Delta D_n = \alpha_n - \alpha_{n-2} \quad (1)$$

$$\kappa_{\varphi n-1}\Delta D_{n-1} + \kappa_{\varphi n}\Delta D_n = \varphi_n - \varphi_{n-2} \quad (2)$$

$$\Delta Z_{AC} = \frac{\Delta D_{n-1}}{2}(\cos\alpha_{n-2} + \cos\alpha_{n-1}) + \frac{\Delta D_n}{2}(\cos\alpha_{n-1} + \cos\alpha_n) \quad (3)$$

$$\Delta X_{AC} = \frac{\Delta D_{n-1}}{2}(\sin\alpha_{n-2} + \cos\varphi_{n-2} + \sin\alpha_{n-1}\cos\varphi_{n-1}) + \quad (4)$$

$$\frac{\Delta D_n}{2}(\sin\alpha_{n-1}\cos\varphi_{n-1} + \sin\alpha_n\cos\varphi_n)$$

$$\Delta Y_{AC} = \frac{\Delta D_{n-1}}{2}(\sin\alpha_{n-2}\sin\varphi_{n-2} + \sin\alpha_{n-1}\sin\varphi_{n-1}) + \quad (5)$$

$$\frac{\Delta D_n}{2}(\sin\alpha_{n-1}\sin\varphi_{n-1} + \sin\alpha_n\sin\varphi_n)$$

where $\alpha_{n-1} = \alpha_n - \kappa_{\alpha n}\Delta D_n$

Min. energy $\Longrightarrow \frac{dE_{(abs)n}}{d\Delta D_n} = 0 \quad (6)$

Using Eqs. (1)-(5), the 5 parameters ($\Delta D_{n-1}$, $\kappa_{\alpha n-1}$, $\kappa_{\alpha n}$, $\kappa_{\varphi-1}$, $\kappa_{\varphi n}$) can be expressed as functions of $\Delta D_n$.

From Eq.(3), $\cos \alpha_{n-1} = \dfrac{2\Delta Z_{AC} - \Delta D_{n-1} \cos \alpha_{n-2} - \Delta D_n \cos \alpha_n}{\Delta D_{n-1} + \Delta D_n}$ (7)

From Eq.(4), (5) $\sin \alpha_{n-1} \cos \varphi_{n-1} =$ (8)
$\dfrac{2\Delta X_{AC} - \Delta D_{n-1} \sin \alpha_{n-2} \cos \varphi_{n-2} - \Delta D_n \sin \alpha_n \cos \varphi_n}{\Delta D_{n-1} + \Delta D_n}$ $\sin \alpha_{n-1} \sin \varphi_{n-1} =$ (9)
$\dfrac{2\Delta Y_{AC} - \Delta D_{n-1} \sin \alpha_{n-2} \sin \varphi_{n-2} - \Delta D_n \sin \alpha_n \sin \varphi_n}{\Delta D_{n-1} + \Delta D_n}$ Eq.(7)^2 + Eq.(8)^2 + Eq(9)^2, we have $\Delta D_{n-1} =$ (10)

$\dfrac{(\Delta X^2 + \Delta Y^2 + \Delta Z^2) - \Delta D_n(\Delta Z \cos \alpha_n + \Delta X \sin \alpha_n \cos \varphi_n + \Delta Y \sin \alpha_n \sin \varphi_n)}{\Delta D_n(1 - \cos \beta)/2 + (\Delta Z \cos \alpha_{n-2} + \Delta X \sin \alpha_{n-2} \cos \varphi_{n-2} + \Delta Y \sin \alpha_{n-2} \sin \varphi_{n-2})}$ where $\cos \beta = \cos \alpha_{n-2} \cos \alpha_n + \sin \alpha_{n-2} \sin \alpha_n \cos(\varphi_n - \varphi_{n-2})$ From Eq.(7), $\alpha_{n-1} = \pm \arccos\left(\dfrac{2\Delta Z - \Delta D_{n-1} \cos \alpha_{n-2} - \Delta D_n \cos \alpha_n}{\Delta D_{n-1} + \Delta D_n}\right)$ $\kappa_{\alpha n-1} = (\alpha_{n-1} - \alpha_{n-2})/\Delta D_{n-1}, \kappa_{\alpha n} = (\alpha_n - \alpha_{n-1})/\Delta D_n$ (11)

Eq(8) ÷ Eq.(9), $\varphi_{n-1} =$
$\arctan\left(\dfrac{2\Delta Y - \Delta D_{n-1} \sin \alpha_{n-2} \sin \varphi_{n-2} - \Delta D_n \sin \alpha_n \sin \varphi_n}{2\Delta X - \Delta D_{n-1} \sin \alpha_{n-2} \cos \varphi_{n-2} - \Delta D_n \sin \alpha_n \cos \varphi_n}\right)$ $\kappa_{\varphi n-1} = (\varphi_{n-1} - \varphi_{n-2})/\Delta D_{n-1}, \kappa_{\varphi n} = (\varphi_n - \varphi_{n-1})/\Delta D_n$ (12)

Figure 9:
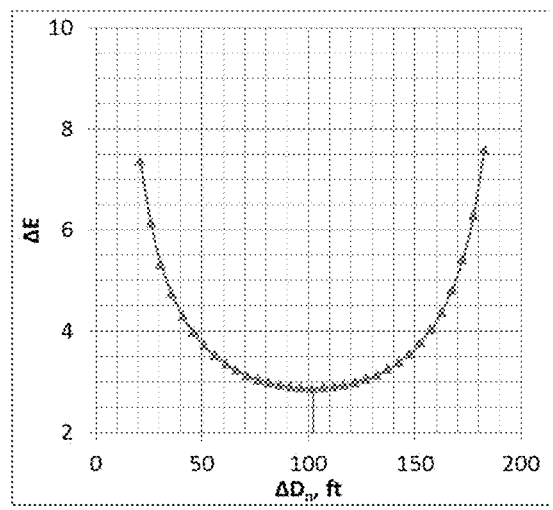
FIG. 9 is a graph illustrating the incremental wellbore energy $\Delta E$ versus different $\Delta D_n$ using a balanced tangential method for wellbore trajectory calculation in accordance with the disclosed embodiments.

In one embodiment, the process numerically calculates the incremental wellbore energy $\Delta E$ versus different $\Delta D_n$ as illustrated in FIG. 9. The process can also determine the $\Delta D_n$ corresponding to the minimum wellbore energy increase $\Delta E$. Once $\Delta D_n$ is known, all other parameters can be calculated using Equations (10-12).

In an alternative embodiment, the disclosed embodiments may use the minimum curvature method to obtain wellbore returning parameters using the following equations:

$\kappa_{\alpha n-1} \Delta D_{n-1} + \kappa_{\alpha n} \Delta D_n = \alpha_n - \alpha_{n-2}$ (13)

$\kappa_{\varphi n-1} \Delta D_{n-1} + \kappa_{\varphi n} \Delta D_n = \varphi_n - \varphi_{n-2}$ (14)

$\Delta Z_{AC} = \lambda_{n-1}(\cos \alpha_{n-1} + \cos \alpha_{n-2}) + \lambda_n(\cos \alpha_n + \cos \alpha_{n-1})$ (15)

$\Delta X_{AC} = \lambda_{n-1}(\sin \alpha_{n-2} \cos \varphi_{n-2} + \sin \alpha_{n-1} \cos \varphi_{n-1}) + \lambda_n(\sin \alpha_{n-1} \cos \varphi_{n-1} + \sin \alpha_n \cos \varphi_n)$ (16)

$\Delta Y_{AC} = \lambda_{n-1}(\sin \alpha_{n-2} \sin \varphi_{n-2} + \sin \alpha_{n-1} \sin \varphi_{n-1}) + \lambda_n(\sin \alpha_{n-1} \sin \varphi_{n-1} + \sin \alpha_n \sin \varphi_n)$ (17)

where $\alpha_{n-1} = \alpha_n - \kappa_{\alpha n} \Delta D_n = \alpha_{n-2} + \kappa_{\alpha n-1} \Delta D_{n-1}$
$\varphi_{n-1} = \varphi_n - \kappa_{\varphi n} \Delta D_n = \varphi_{n-2} + \kappa_{\varphi n-1} \Delta D_{n-1}$
$\lambda_i = \dfrac{180}{\pi} \dfrac{\Delta D_i}{\varepsilon_i} \tan \dfrac{\varepsilon_i}{2}$
$\cos \varepsilon_i = \cos \alpha_{i-1} \cos \alpha + \sin \alpha_{n-1} \sin \alpha \cos(\varphi_i - \varphi_{i-1})$ Using Eqs. (13)-(17), the parameters ($\Delta D_n$, $\Delta D_{n-1}$, $\kappa_{\alpha n-1}$, $\kappa_{\alpha n}$, $\kappa_{\varphi n-1}$, $\kappa_{\varphi n}$) can be expressed as functions of $\lambda_n$ as indicated below;

$\lambda_{n-1} =$ (18)
$\dfrac{(\Delta X^2 + \Delta Y^2 + \Delta Z^2) - 2\lambda_n(\Delta Z \cos \alpha_n + \Delta X \sin \alpha_n \cos \varphi_n + \Delta Y \sin \alpha_n \sin \varphi_n)}{\lambda_n(1 - \cos \beta) + (\Delta Z \cos \alpha_{n-2} + \Delta X \sin \alpha_{n-2} \cos \varphi_{n-2} + \Delta Y \sin \alpha_{n-2} \sin \varphi_{n-2})}$ where $\cos \beta = \cos \alpha_{n-2} \cos \alpha_n + \sin \alpha_{n-2} \sin \alpha_n \cos(\varphi_n - \varphi_{n-2})$.

Therefore $\alpha_{n-1} = \pm \arccos\left(\dfrac{\Delta Z - \lambda_{n-1} \cos \alpha_{n-2} - \lambda_n \cos \alpha_n}{\lambda_{n-1} + \lambda_n}\right)$ $\varphi_{n-1} = \arctan\left(\dfrac{\Delta Y - \lambda_{n-1} \sin \alpha_{n-2} \sin \varphi_{n-2} - \lambda_n \sin \alpha_n \sin \varphi_n}{\Delta X - \lambda_{n-1} \sin \alpha_{n-2} \cos \varphi_{n-2} - \lambda_n \sin \alpha_n \cos \varphi_n}\right)$ $\cos \varepsilon_{n-1} = \cos \alpha_{n-2} \cos \alpha_{n-1} + \sin \alpha_{n-2} \sin \alpha_{n-1} \cos(\varphi_{n-1} - \varphi_{n-2})$
$\cos \varepsilon_n = \cos \alpha_n \cos \alpha_{n-1} + \sin \alpha_n \sin \alpha_{n-1} \cos(\varphi_n - \varphi_{n-1})$ $\Delta D_i = \dfrac{\pi \lambda_i \varepsilon_i}{180 \tan \dfrac{\varepsilon_i}{2}} = \dfrac{\pi \lambda_i \varepsilon_i}{180} \cot \dfrac{\varepsilon_i}{2}, i = n-1, n$ (19)

$\kappa_{\alpha n-1} = (\alpha_{n-1} - \alpha_{n-2})/\Delta D_{n-1}, \kappa_{\alpha n} = (\alpha_n - \alpha_{n-1})/\Delta D_n$ (20)

$\kappa_{\varphi n-1} = (\varphi_{n-1} - \varphi_{n-2})/\Delta D_{n-1}, \kappa_{\varphi n} = (\varphi_n - \varphi_{n-1})/\Delta D_n$ (21)

By selecting a value of $\lambda_n$, the process can calculate $\Delta D_{n-1}$, $\Delta D_n$, $\kappa_{\alpha n-1}$, $\kappa_{\varphi n-1}$, $\kappa_{\varphi n}$, and normalized wellbore energy $E_{(abs)n}$. By changing the value of $\lambda_n$, the process can determine a series of value of $E_{(abs)n}$, $\Delta D_n$, etc. The process can then perform a comparison to determine the minimum $E_{(abs)n}$ and corresponding parameters such as $\kappa_{\alpha n}$, and $\Delta D_n$.

Still, in another embodiment, the process can implement a natural curve method to obtain wellbore returning parameters (i.e., a correction path) using the following equations:

$\kappa_{\alpha n-1} \Delta D_{n-1} + \kappa_{\alpha n} \Delta D_n = \alpha_n - \alpha_{n-2}$ (22)

$\kappa_{\varphi n-1} \Delta D_{n-1} + \kappa_{\varphi n} \Delta D_n = \varphi_n - \varphi_{n-2}$ (23)

$\Delta Z_{AC} = \dfrac{180}{\pi \kappa_{\alpha n-1}}(\sin \alpha_{n-1} - \sin \alpha_{n-2}) + \dfrac{180}{\pi \kappa_{\alpha n}}(\sin \alpha_n - \sin \alpha_{n-1})$ (24)

$2\Delta X_{AC} = \dfrac{180}{\pi(\kappa_{\alpha n-1} - \kappa_{\varphi n-1})}[\cos(\alpha_{n-2} - \varphi_{n-2}) - \cos(\alpha_{n-1} - \varphi_{n-1})] +$ (25)
$\dfrac{180}{\pi(\kappa_{\alpha n-1} + \kappa_{\varphi n-1})}[\cos(\alpha_{n-2} + \varphi_{n-2}) - \cos(\alpha_{n-1} + \varphi_{n-1})] +$
$\dfrac{180}{\pi(\kappa_{\alpha n} - \kappa_{\varphi n})}[\cos(\alpha_{n-1} - \varphi_{n-1}) - \cos(\alpha_n - \varphi_n)] +$
$\dfrac{180}{\pi(\kappa_{\alpha n} + \kappa_{\varphi n})}[\cos(\alpha_{n-1} + \varphi_{n-1}) - \cos(\alpha_n + \varphi_n)]$ $2\Delta Y_{AC} = \dfrac{180}{\pi(\kappa_{\alpha n-1} - \kappa_{\varphi n-1})}[\sin(\alpha_{n-1} - \varphi_{n-1}) - \sin(\alpha_{n-2} - \varphi_{n-2})] -$ (26)
$\dfrac{180}{\pi(\kappa_{\alpha n-1} + \kappa_{\varphi n-1})}[\sin(\alpha_{n-1} + \varphi_{n-1}) - \sin(\alpha_{n-2} + \varphi_{n-2})] +$
$\dfrac{180}{\pi(\kappa_{\alpha n} - \kappa_{\varphi n})}[\sin(\alpha_n - \varphi_n) - \sin(\alpha_{n-1} - \varphi_{n-1})] -$
$\dfrac{180}{\pi(\kappa_{\alpha n} + \kappa_{\varphi n})}[\sin(\alpha_n + \varphi_n) - \sin(\alpha_{n-1} + \varphi_{n-1})]$ where $\alpha_{n-1} = \alpha_n - \kappa_{\alpha n} \Delta D_n = \alpha_{n-2} + \kappa_{\alpha n-1} \Delta D_{n-1}$,
$\varphi_{n-1} = \varphi_n - \kappa_{\varphi n} \Delta D_n = \varphi_{n-2} + \kappa_{\varphi n-1} \Delta D_{n-1}$ -continued $$\kappa_{an-1} = \frac{-\frac{360}{\pi}\left(\sin^2\frac{\alpha_n - \alpha_{n-2}}{2} + \cos\alpha_n \cos\alpha_{n-2} \sin^2\frac{\varphi_n - \varphi_{n-2}}{2}\right) + }{\frac{\pi}{360}\kappa_{an}(\Delta X^2 + \Delta Y^2 + \Delta Z^2) +} \quad (27)$$
$$\frac{\kappa_{an}(\Delta X \cos\alpha_{n-2} \cos\varphi_{n-2} + \Delta Y \cos\alpha_{n-2} \sin\varphi_{n-2} - \Delta Z \sin\alpha_{n-2})}{(\Delta X \cos\alpha_n \cos\varphi_n + \Delta Y \cos\alpha_n \sin\varphi_n - \Delta Z \sin\alpha_n)}$$

The parameters of $\Delta D_n$, $\Delta D_{n-1}$ can express in terms of $\kappa_{\alpha n}$ based on the following equations:

$$\alpha_{n-1} = \alpha_n - \kappa_{an}\Delta D_n = \alpha_{n-2} + \kappa_{an-1}\Delta D_{n-1}$$

$$\Delta D_n = (\alpha_n - \alpha_{n-1})/\kappa_{an}$$

$$\Delta D_{n-1} = (\alpha_{n-1} - \alpha_{n-2})/\kappa_{an-1}$$

where $\alpha_{n-1} =$ $$\frac{180}{\pi}\arcsin\left(\frac{\frac{\pi}{180}\kappa_{an}\kappa_{an-1}\Delta Z_{AC} + \kappa_{an} \sin\alpha_{n-2} - \kappa_{an-1} \sin\alpha_n}{\kappa_{an} - \kappa_{an-1}}\right)$$

with unit in deg $$0 = \left[\left(\frac{\varphi_n - \varphi_{n-2}}{\Delta D_n} - \kappa_{\varphi n-1}\frac{\Delta D_{n-1}}{\Delta D_n}\right)^2 \kappa_{\varphi n-1}^2 - \kappa_{an}^2\kappa_{\varphi n-1}^2 - \right. \quad (28)$$
$$\left.\left(\frac{\varphi_n - \varphi_{n-2}}{\Delta D_n} - \kappa_{\varphi n-1}\frac{\Delta D_{n-1}}{\Delta D_n}\right)^2 \kappa_{an-1}^2\right]\left(\frac{\pi}{180}\right)^2(\Delta X^2 + \Delta Y^2) + $$
$$\kappa_{\varphi n-1}^2 \sin^2\alpha_n + \left(\frac{\varphi_n - \varphi_{n-2}}{\Delta D_n} - \kappa_{\varphi n-1}\frac{\Delta D_{n-1}}{\Delta D_n}\right)^2 \sin^2\alpha_{n-2} - $$
$$\left(\frac{\varphi_n - \varphi_{n-2}}{\Delta D_n} - \kappa_{\varphi n-1}\frac{\Delta D_{n-1}}{\Delta D_n} - \kappa_{\varphi n-1}\right)^2 \sin^2\alpha_{n-1} - $$
$$\frac{\pi}{90}\kappa_{an}\kappa_{\varphi n-1}^2 \cos\alpha_n(\Delta X \cos\varphi_n + \Delta Y \sin\varphi_n) + $$
$$\frac{\pi}{90}\left(\frac{\varphi_n - \varphi_{n-2}}{\Delta D_n} - \kappa_{\varphi n-1}\frac{\Delta D_{n-1}}{\Delta D_n}\right)(\kappa_{an-1}^2 - \kappa_{\varphi n-1}^2)$$
$$\sin\alpha_n(\Delta X \sin\varphi_n - \Delta Y \cos\varphi_n) + $$
$$\frac{\pi}{90}\kappa_{an-1}\left(\frac{\varphi_n - \varphi_{n-2}}{\Delta D_n} - k_{\varphi n-1}\frac{\Delta D_{n-1}}{\Delta D_n}\right)^2 \cos$$
$$\alpha_{n-2}(\Delta X \cos\varphi_{n-2} - \Delta Y \sin\varphi_{n-2}) - $$
$$\frac{\pi}{90}\kappa_{\varphi n-1}(\kappa_{an-1}^2 - \kappa_{\varphi n-1}^2)\sin\alpha_{n-2}(\Delta X \sin\varphi_{n-2} + \Delta Y \cos\varphi_{n-2}) - $$
$$2\left(\frac{\varphi_n - \varphi_{n-2}}{\Delta D_n} - \kappa_{\varphi n-1}\frac{\Delta D_{n-1}}{\Delta D_n}\right)\kappa_{an-1} \sin\alpha_n \cos\alpha_{n-2}$$
$$\sin(\varphi_n - \varphi_{n-2}) - 2\kappa_{\varphi n-1}\left(\frac{\varphi_n - \varphi_{n-2}}{\Delta D_n} - \kappa_{\varphi n-1}\frac{\Delta D_{n-1}}{\Delta D_n}\right)\sin\alpha_n \sin$$
$$\alpha_{n-2} \cos(\varphi_n - \varphi_{n-2}) + 2\kappa_{an}\kappa_{\varphi n-1} \cos\alpha_n \sin\alpha_{n-2} \sin(\varphi_n - \varphi_{n-2})$$

In one embodiment, the process can solve Equation 28 using iteration methods to obtain $\kappa_{\varphi n-1}$. Then $\kappa_{\varphi n}$ can be calculated as $$\kappa_{\phi n} = \frac{\phi_n - \phi_{n-2}}{\Delta D_n} - \kappa_{\phi n-1}\frac{\Delta D_{n-1}}{\Delta D_n} \quad (29)$$

By selecting a select a value of $\kappa_{an}$, the process can calculate $\Delta D_{n-1}$, $\Delta D_n$, $\kappa_{an-1}$, $\kappa_{\varphi n-1}$, $\kappa_{\varphi n}$, and normalized wellbore energy $E_{(abs)n}$. By changing the value of $K_{an}$, the process determines a value series of $E_{(abs)n}$, $\kappa_{an}$, etc. The process can then perform a comparison to determine the minimum $E_{(abs)n}$ and corresponding parameters such as $\kappa_{an}$, $\Delta D_n$, etc.

Based on the results of the minimum energy algorithm/solver, the process at step 614 determines the trajectory correction parameters such as, but not limited to, $\kappa_\alpha$, $\kappa_\varphi$, and $\Delta$MD. The process updates the correction path data at step 616. At step 618, the process determines the vertical $\Delta y$ and horizontal $\Delta x$ shaft deflection. The process then initiates the actuator(s) at step 620 to perform the displacement based on the determined shaft deflection, with the process repeating at step 602.

Figure 10:
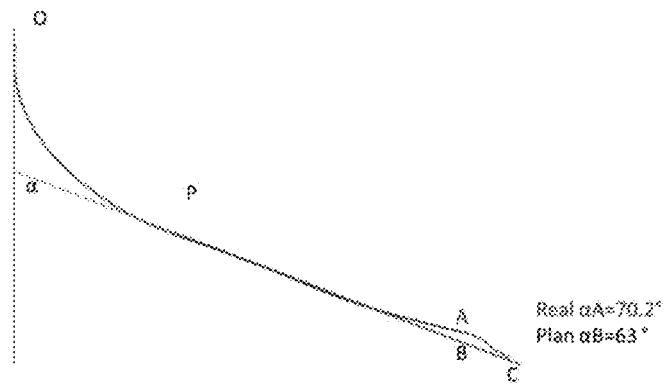
FIG. 10 is a diagram depicting a first example of a 2D J-Type Well in which the disclosed embodiments may be applied.

To help further describe the disclosed embodiments. FIGS. 10-17 help illustrate examples that demonstrate how the disclosed embodiments can be applied. For example, as a first example, the disclosed embodiments is applied to a 2D J-Type Well as illustrated in FIG. 10 having the following parameters:

Planned Path: OP (1020 ft)—Build 6°/100 ft, PB(960 ft)—hold 0°/100 ft

Assuming: Torsion-yielding azimuth rate=0.1°/100 ft, Real path overlaps planned path after ~200 ft correction drilling.

Figure 11:
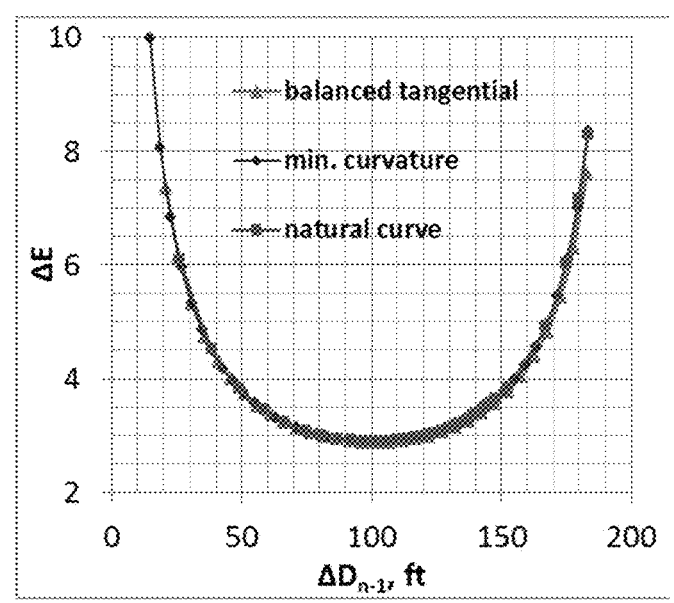
FIG. 11 illustrates the incremental wellbore energy vs. section length $\Delta D_{n-1}$ for the first example using minimum incremental wellbore energy methods in accordance with the disclosed embodiments.

FIG. 11 illustrates the incremental wellbore energy vs. section length $\Delta D_{n-1}$ based on each of the above described minimum incremental wellbore energy methods. The parameters of each of the methods are:

Min. Energy locations:
Balanced Tangential Method $\Delta Dn-1=101.4$ ft
Min. Curvature Method $\Delta Dn-1=100.6$ ft
Natural Curve method $\Delta Dn-1=101.6$ ft
Parameters to realize minimum dogleg severity are
Min. energy path: 100 ft @-14.9°/100 ft and 100 ft @6°/100 ft
$\Delta Dn-1$ location: roughly ½ of $\Delta L$
Min. dogleg severity path: 129 ft @-12.46°/100 ft and 71 ft @-12.46°/100 ft.
$\Delta Dn-1$ location: roughly ⅓ of $\Delta L$ (FIG. 8)

Figure 12:
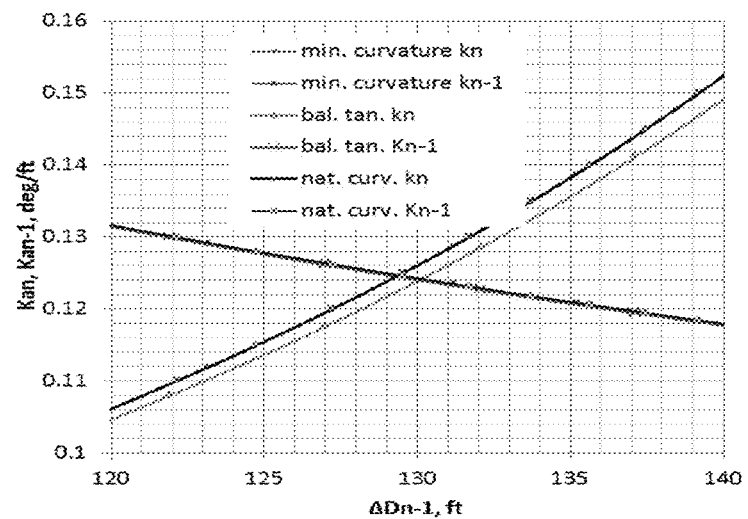
FIG. 12 illustrates the build/drop rate of returning path sections versus section length of the first example in accordance with the disclosed embodiments.

FIG. 12 illustrates the build/drop rate of returning path sections versus section length.

Figure 13:
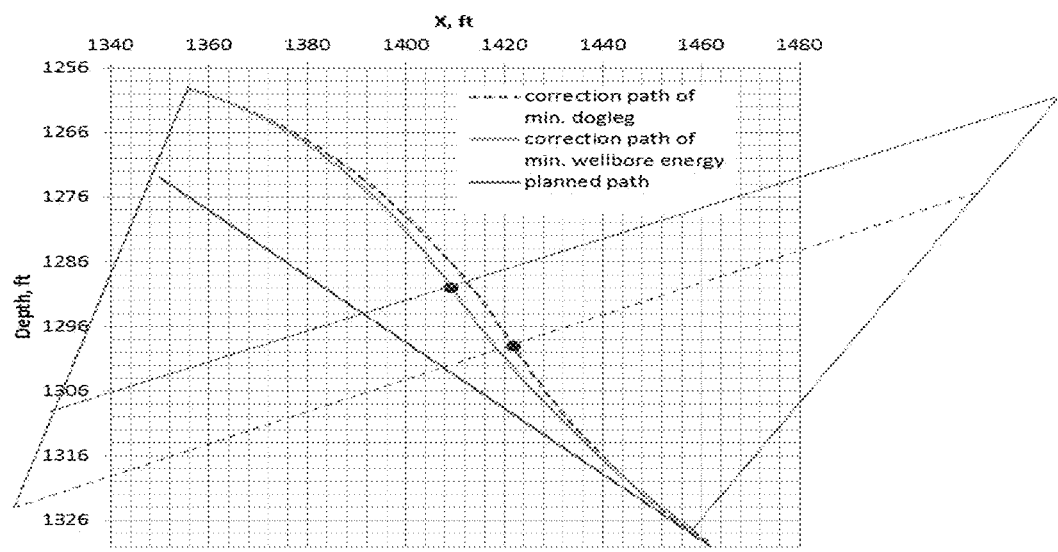
FIG. 13 illustrates the correction paths of minimum $E_{(abs)n}$ vs. minimum dogleg severity of the first example in accordance with the disclosed embodiments.

FIG. 13 illustrates the correction paths of minimum $E_{(abs)n}$ vs. minimum dogleg severity.

Figure 14:
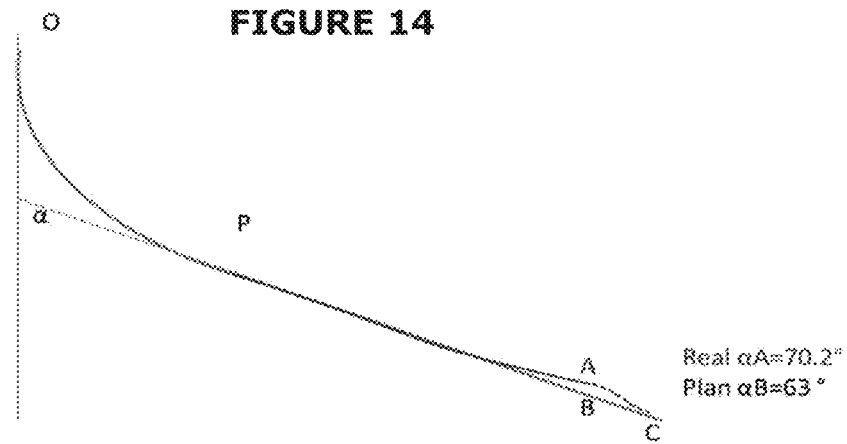
FIG. 14 is a diagram depicting a second example of a 3D J-Type Well in which the disclosed embodiments may be applied.
Figure 15:
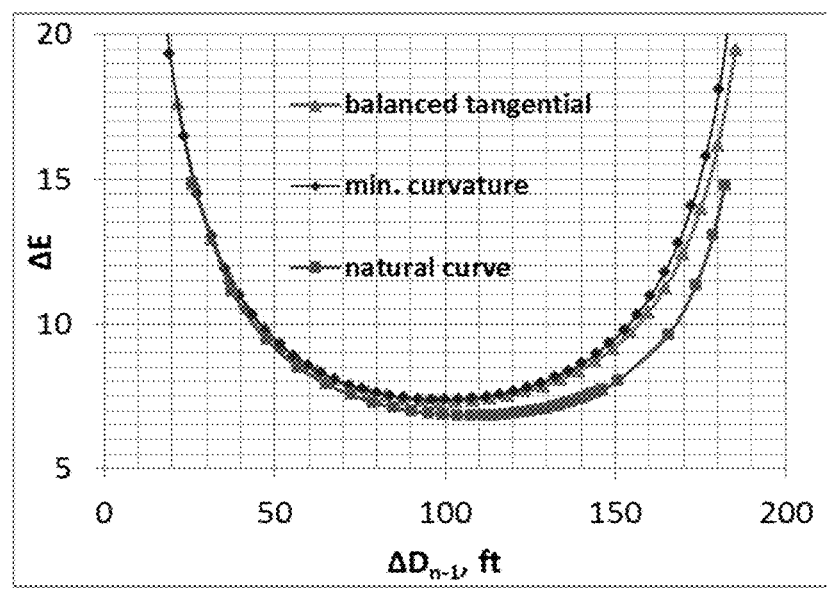
FIG. 15 illustrates the incremental wellbore energy vs. section length $\Delta D_{n-1}$ for the second example using minimum incremental wellbore energy methods in accordance with the disclosed embodiments.

As a second example, the disclosed embodiments is applied to a 3D J-Type Well as illustrated in FIG. 14 having the following parameters:

Planned Path: OP (1020 ft)—Build, $K\alpha=6°/100$ ft, Azimuth=45°
PQ(960 ft)—hold, $\kappa\alpha 0°/100$ ft, Azimuth=45°
Noise azimuth rate: $K\varphi=+/-0.5°/100$ ft
At section QA: $K\alpha=6°/100$ ft, $K\varphi=6°/100$ ft FIG. 15 is a graph that illustrates the incremental wellbore energy vs. section length $\Delta D_{n-1}$ based on each of the above described minimum incremental wellbore energy methods. The calculated results of wellbore path correction parameters of 3D J-Type Well is presented below in Table 1.

| Method | $\Delta Dn$ | $\Delta Dn-1$ | $\Delta L$ | $K\alpha n$ | $K\alpha n-1$ | $K\varphi n$ | $K\varphi n-1$ |
|---|---|---|---|---|---|---|---|
| Balanced tangential | 103 | 100.05 | 203.05 | 7.17 | −14.57 | 8.6 | −16.03 |
| Min. curvature | 102.91 | 98.79 | 201.7 | 7.17 | −14.8 | 8.6 | −16.2 |
| Natural curve | 93 | 107.5 | 200.5 | 9 | −14.49 | 9 | −14.49 |

Figure 16:
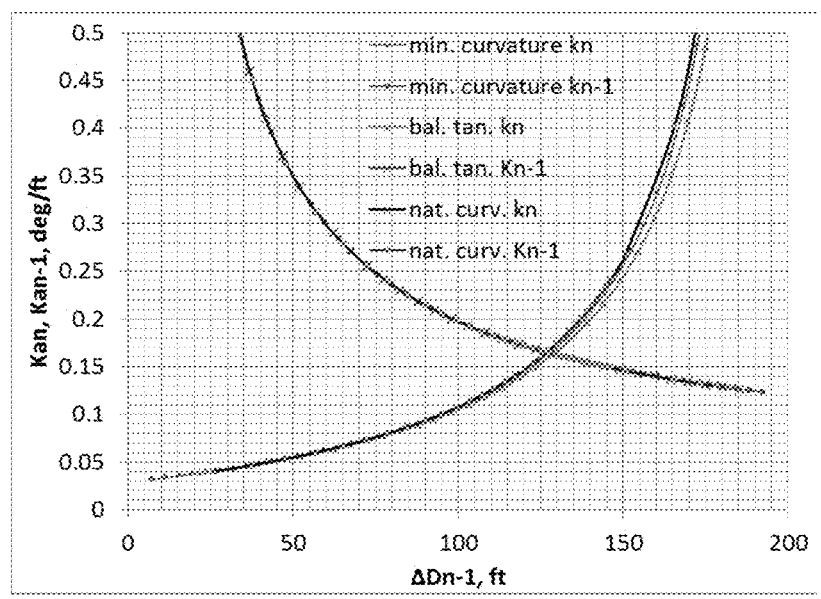
FIG. 16 is a graph that illustrates inclination rate and azimuth rate vs. section length of the second example in accordance with the disclosed embodiments.

FIG. 16 is a graph that illustrates inclination rate and azimuth rate vs. section length. The cross points show the section lengths for minimum dogleg severity. Consistent with the 2D case, the minimum dogleg severity position is at roughly ⅔ of total length.

Accordingly, the disclosed embodiments present a system, computer-implemented method, and computer program product that modifies the conventional PID controller to implement a minimum wellbore energy method for performing automated downhole wellbore trajectory control for correcting between an actual wellbore trajectory path and a planned wellbore trajectory path.

While specific details about the above embodiments have been described, the above hardware and software descriptions are intended merely as example embodiments and are not intended to limit the structure or implementation of the disclosed embodiments. For instance, although many other internal components of the control system 100 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures and as described herein. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the embodiments described above, many examples of specific combinations are within the scope of the disclosure, some of which are detailed in the below.

Example One. A computer-implemented method for performing automated downhole wellbore trajectory control for correcting between an actual wellbore trajectory path and a planned wellbore trajectory path, the method comprising: receiving real-time path data for determining the actual wellbore trajectory path; receiving parameters for the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; and automatically initiating the downhole wellbore trajectory control to change the actual wellbore trajectory path to a modified correction path.

Example Two. A computer-implemented method for performing automated downhole wellbore trajectory control for correcting between an actual wellbore trajectory path and a planned wellbore trajectory path, the method comprising: receiving real-time path data for determining the actual wellbore trajectory path; receiving parameters for the planned wellbore trajectory path; determining a trend angle and a deviation vector length between the actual wellbore trajectory path and the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; and automatically initiating the downhole wellbore trajectory control to change the actual wellbore trajectory path to a modified correction path.

Example Three. A computer-implemented method for performing automated downhole wellbore trajectory control for correcting between an actual wellbore trajectory path and a planned wellbore trajectory path, the method comprising: receiving real-time path data for determining the actual wellbore trajectory path; receiving parameters for the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; determining a vertical shaft deflection and horizontal shaft deflection for changing the actual wellbore trajectory path to the modified correction path; and automatically initiating the downhole wellbore trajectory control to change the actual wellbore trajectory path to a modified correction path.

Example Four. A computer-implemented method for performing automated downhole wellbore trajectory control for correcting between an actual wellbore trajectory path and a planned wellbore trajectory path, the method comprising: receiving real-time path data for determining the actual wellbore trajectory path, wherein the real-time path data includes measured depth (MD), horizontal departure along south-north direction (X), horizontal departure along west-east direction (Y), true vertical depth (Z), inclination angle ($\alpha$), azimuth angle ($\varphi$), and tool face angle; receiving parameters for the planned wellbore trajectory path, wherein the parameters of the planned wellbore trajectory path includes measured depth (MD), horizontal departure along south-north direction (X), horizontal departure along west-east direction (Y), true vertical depth (Z), inclination angle ($\alpha$), azimuth angle ($\varphi$), pay zone location, and maximum dogleg severity; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; and automatically initiating the downhole wellbore trajectory control to change the actual wellbore trajectory path to a modified correction path.

Example Five. A computer-implemented method for performing automated downhole wellbore trajectory control for correcting between an actual wellbore trajectory path and a planned wellbore trajectory path, the method comprising: receiving real-time path data for determining the actual wellbore trajectory path; receiving parameters for the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; determining a vertical shaft deflection and horizontal shaft deflection for changing the actual wellbore trajectory path to the modified correction path; and automatically initiating the downhole wellbore trajectory control to change the actual wellbore trajectory path to a modified correction path, wherein changing the actual wellbore trajectory path to the modified correction path includes initiating a first actuator for performing the vertical shaft deflection and initiating a second actuator for performing the horizontal shaft deflection.

Example Six. A computer-implemented method for performing automated downhole wellbore trajectory control for correcting between an actual wellbore trajectory path and a planned wellbore trajectory path, the method comprising: receiving real-time path data for determining the actual wellbore trajectory path; receiving parameters for the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method, wherein the minimum incremental wellbore energy method is at least one of a balanced tangential method, a minimum curvature method, and a natural curve method; and automatically initiating the downhole wellbore trajectory control to change the actual wellbore trajectory path to a modified correction path.

Example Seven. Non-transitory computer readable medium comprising computer executable instructions for performing automated downhole wellbore trajectory control for correcting between an actual wellbore trajectory path and a planned wellbore trajectory path, the computer executable instructions when executed causes one or more machines to perform operations comprising: receiving real-time path data for determining the actual wellbore trajectory path; receiving parameters for the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; and automatically initiating the downhole wellbore trajectory control to change the actual wellbore trajectory path to a modified correction path.

Example Eight. Non-transitory computer readable medium comprising computer executable instructions for performing automated downhole wellbore trajectory control for correcting between an actual wellbore trajectory path and a planned wellbore trajectory path, the computer executable instructions when executed causes one or more machines to perform operations comprising: receiving real-time path data for determining the actual wellbore trajectory path; receiving parameters for the planned wellbore trajectory path; determining a trend angle and a deviation vector length between the actual wellbore trajectory path and the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; and automatically initiating the downhole wellbore trajectory control to change the actual wellbore trajectory path to a modified correction path.

Example Nine. Non-transitory computer readable medium comprising computer executable instructions for performing automated downhole wellbore trajectory control for correcting between an actual wellbore trajectory path and a planned wellbore trajectory path, the computer executable instructions when executed causes one or more machines to perform operations comprising: receiving real-time path data for determining the actual wellbore trajectory path; receiving parameters for the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; determining a vertical shaft deflection and horizontal shaft deflection for changing the actual wellbore trajectory path to the modified correction path; and automatically initiating the downhole wellbore trajectory control to change the actual wellbore trajectory path to a modified correction path.

Example Ten. Non-transitory computer readable medium comprising computer executable instructions for performing automated downhole wellbore trajectory control for correcting between an actual wellbore trajectory path and a planned wellbore trajectory path, the computer executable instructions when executed causes one or more machines to perform operations comprising: receiving real-time path data for determining the actual wellbore trajectory path; wherein the real-time path data includes measured depth (MD), horizontal departure along south-north direction (X), horizontal departure along west-east direction (Y), true vertical depth (Z), inclination angle ($\alpha$), azimuth angle ($\varphi$), and tool face angle; receiving parameters for the planned wellbore trajectory path, wherein the parameters of the planned wellbore trajectory path includes measured depth (MD), horizontal departure along south-north direction (X), horizontal departure along west-east direction (Y), true vertical depth (Z), inclination angle ($\alpha$), azimuth angle ($\varphi$), pay zone location, and maximum dogleg severity; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; and automatically initiating the downhole wellbore trajectory control to change the actual wellbore trajectory path to a modified correction path.

Example Eleven. Non-transitory computer readable medium comprising computer executable instructions for performing automated downhole wellbore trajectory control for correcting between an actual wellbore trajectory path and a planned wellbore trajectory path, the computer executable instructions when executed causes one or more machines to perform operations comprising: receiving real-time path data for determining the actual wellbore trajectory path; receiving parameters for the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; determining a vertical shaft deflection and horizontal shaft deflection for changing the actual wellbore trajectory path to the modified correction path; and automatically initiating the downhole wellbore trajectory control to change the actual wellbore trajectory path to a modified correction path, wherein changing the actual wellbore trajectory path to the modified correction path includes initiating a first actuator for performing the vertical shaft deflection and initiating a second actuator for performing the horizontal shaft deflection.

Example Twelve. Non-transitory computer readable medium comprising computer executable instructions for performing automated downhole wellbore trajectory control for correcting between an actual wellbore trajectory path and a planned wellbore trajectory path, the computer executable instructions when executed causes one or more machines to perform operations comprising receiving real-time path data for determining the actual wellbore trajectory path; receiving parameters for the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method, wherein the minimum incremental wellbore energy method is at least one of a balanced tangential method, a minimum curvature method, and a natural curve method; and automatically initiating the downhole wellbore trajectory control to change the actual wellbore trajectory path to a modified correction path, Example Thirteen. A proportional-integral-derivative (PID) controller for performing automated downhole wellbore trajectory control for correcting between an actual wellbore trajectory path and a planned wellbore trajectory path, the PID controller comprising: at least one processor; and at least one memory coupled to the at least one processor and storing instructions that when executed by the at least one processor performs operations comprising: receiving real-time path data for determining the actual wellbore trajectory path; receiving parameters for the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; and automatically initiating the downhole wellbore trajectory control to change the actual wellbore trajectory path to a modified correction path.

Example Fourteen. A proportional-integral-derivative (PID) controller for performing automated downhole wellbore trajectory control for correcting between an actual wellbore trajectory path and a planned wellbore trajectory path, the PID controller comprising: at least one processor; and at least one memory coupled to the at least one processor and storing instructions that when executed by the at least one processor performs operations comprising: receiving real-time path data for determining the actual wellbore trajectory path; receiving parameters for the planned wellbore trajectory path; determining a trend angle and a deviation vector length between the actual wellbore trajectory path and the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; and automatically initiating the downhole wellbore trajectory control to change the actual wellbore trajectory path to a modified correction path.

Example Fifteen. A proportional-integral-derivative (PID) controller for performing automated downhole wellbore trajectory control for correcting between an actual wellbore trajectory path and a planned wellbore trajectory path, the controller comprising: at least one processor; and at least one memory coupled to the at least one processor and storing instructions that when executed by the at least one processor performs operations comprising:

receiving real-time path data for determining the actual wellbore trajectory path; receiving parameters for the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; determining a vertical shaft deflection and horizontal shaft deflection for changing the actual wellbore trajectory path to the modified correction path; and automatically initiating the downhole wellbore trajectory control to change the actual wellbore trajectory path to a modified correction path.

Example Sixteen. A proportional-integral-derivative (PID) controller for performing automated downhole wellbore trajectory control for correcting between an actual wellbore trajectory path and a planned wellbore trajectory path, the PID controller comprising: at least one processor; and at least one memory coupled to the at least one processor and storing instructions that when executed by the at least one processor performs operations comprising: receiving real-time path data for determining the actual wellbore trajectory path, wherein the real-time path data includes measured depth ND), horizontal departure along south-north direction (X), horizontal departure along west-east direction (Y), true vertical depth (Z), inclination angle ($\alpha$), azimuth angle ($\varphi$), and tool face angle; receiving parameters for the planned wellbore trajectory path, wherein the parameters of the planned wellbore trajectory path includes measured depth (MD), horizontal departure along south-north direction (X), horizontal departure along west-east direction (Y), true vertical depth (Z), inclination angle ($\alpha$), azimuth angle ($\varphi$), pay zone location, and maximum dogleg severity; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; and automatically initiating the downhole wellbore trajectory control to change the actual wellbore trajectory path to a modified correction path.

Example Seventeen. A proportional-integral-derivative (PID) controller for performing automated downhole wellbore trajectory control for correcting between an actual wellbore trajectory path and a planned wellbore trajectory path, the PID controller comprising: at least one processor; and at least one memory coupled to the at least one processor and storing instructions that when executed by the at least one processor performs operations comprising: receiving real-time path data for determining the actual wellbore trajectory path; receiving parameters for the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method; determining a vertical shaft deflection and horizontal shaft deflection for changing the actual wellbore trajectory path to the modified correction path; and automatically initiating the downhole wellbore trajectory control to change the actual wellbore trajectory path to a modified correction path, wherein changing the actual wellbore trajectory path to the modified correction path includes initiating a first actuator for performing the vertical shaft deflection and initiating a second actuator for performing the horizontal shaft deflection.

Example Eighteen. A proportional-integral-derivative (PID) controller for performing automated downhole wellbore trajectory control for correcting between an actual wellbore trajectory path and a planned wellbore trajectory path, the PID controller comprising: at least one processor; and at least one memory coupled to the at least one processor and storing instructions that when executed by the at least one processor performs operations comprising: receiving real-time path data for determining the actual wellbore trajectory path; receiving parameters for the planned wellbore trajectory path; determining whether the actual wellbore trajectory path deviates from the planned wellbore trajectory path; responsive to a determination that the actual wellbore trajectory path deviates from the planned wellbore trajectory path, determining whether the actual wellbore trajectory path deviates from a correction path; responsive to a determination that the actual wellbore trajectory path deviates from the correction path; determining a target point along the planned wellbore trajectory path for modifying the correction path; determining trajectory correction parameters using a minimum incremental wellbore energy method, wherein the minimum incremental wellbore energy method is at least one of a balanced tangential method, a minimum curvature method, and a natural curve method; and automatically initiating the downhole wellbore trajectory control to change the actual wellbore trajectory path to a modified correction path.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A computer-implemented method for performing automated downhole wellbore trajectory control for correcting between an actual wellbore trajectory path and a planned wellbore trajectory path, the method comprising:
   receiving, by a proportional-integral-derivative (PID) controller from measurement tools coupled to a drill string disposed within a wellbore being drilled through a formation, real-time path data for determining the actual wellbore trajectory path of the wellbore as it is drilled through the formation;
   determining, by the PID controller, parameters for the planned wellbore trajectory path;
   determining, by the PID controller, whether the actual wellbore trajectory path deviates from the planned wellbore trajectory path, based on the real-time path data and the parameters of the planned wellbore trajectory path;
   responsive to a determination that the actual wellbore trajectory path deviates from the planned wellbore trajectory path, determining whether the actual wellbore trajectory path deviates from a correction path for the wellbore;
   responsive to a determination that the actual wellbore trajectory path deviates from the correction path, determining a target point along the planned wellbore trajectory path for modifying the correction path;
   determining, by the PID controller, trajectory correction parameters for changing the actual wellbore trajectory path of the wellbore to a modified correction path having a minimum incremental wellbore energy, based on the target point, the minimum incremental wellbore energy determined by an overall angle change, a wellbore curvature, a borehole torsion, and a change in azimuth angle; and
   automatically controlling, by the PID controller, the actual wellbore trajectory path of the wellbore as it is drilled through the formation, based on the trajectory correction parameters determined for the modified correction path.

2. The computer-implemented method of claim 1, further comprising determining a trend angle and a deviation vector length between the actual wellbore trajectory path and the planned wellbore trajectory path in determining whether the actual wellbore trajectory path deviates from the planned wellbore trajectory path.

3. The computer-implemented method of claim 1, further comprising determining a vertical shaft deflection and horizontal shaft deflection for changing the actual wellbore trajectory path to the modified correction path.

4. The computer-implemented method of claim 1, wherein the real-time path data includes measured depth (MD), horizontal departure along south-north direction (X), horizontal departure along west-east direction (Y), true vertical depth (Z), inclination angle ($\alpha$), azimuth angle ($\phi$), and tool face angle.

5. The computer-implemented method of claim 1, wherein the parameters of the planned wellbore trajectory path includes measured depth (MD), horizontal departure along south-north direction (X), horizontal departure along west-east direction (Y), true vertical depth (Z), inclination angle ($\alpha$), azimuth angle ($\phi$), pay zone location, and maximum dogleg severity.

6. The computer-implemented method of claim 3, further comprising initiating a first actuator for performing the vertical shaft deflection and initiating a second actuator for performing the horizontal shaft deflection for changing the actual wellbore trajectory path to the modified correction path.

7. The computer-implemented method of claim 1, wherein the minimum incremental wellbore energy method is a balanced tangential method.

8. The computer-implemented method of claim 1, wherein the minimum incremental wellbore energy method is a minimum curvature method.

9. The computer-implemented method of claim 1, wherein the minimum incremental wellbore energy method is a natural curve method.

10. A non-transitory computer readable medium comprising computer executable instructions for performing automated downhole wellbore trajectory control for correcting between an actual wellbore trajectory path and a planned wellbore trajectory path, the computer executable instructions when executed cause a proportional-integral-derivative (PID) controller to perform operations comprising:
   receiving, from measurement tools coupled to a drill string disposed within a wellbore being drilled through a formation, real-time path data for determining the actual wellbore trajectory path;
   receiving parameters for the planned wellbore trajectory path;
   determining whether the actual wellbore trajectory path deviates from the planned wellbore trajectory path, based on the real-time path data and the parameters of the planned wellbore trajectory path;
   responsive to a determination that the actual wellbore trajectory path deviates from the planned wellbore trajectory path, determining whether the actual wellbore trajectory path deviates from a correction path for the wellbore;
   responsive to a determination that the actual wellbore trajectory path deviates from the correction path, determining a target point along the planned wellbore trajectory path for modifying the correction path;
   determining trajectory correction parameters for changing the actual wellbore trajectory path of the wellbore to a modified correction path having a minimum incremental wellbore energy, based on the target point, the minimum incremental wellbore energy determined by an overall angle change, a wellbore curvature, a borehole torsion, and a change in azimuth angle; and
   automatically controlling the actual wellbore trajectory path of the wellbore as it is drilled through the formation, based on the trajectory correction parameters determined for the modified correction path.

11. The computer readable medium of claim 10, wherein the operations further comprises determining a trend angle and a deviation vector length between the actual wellbore trajectory path and the planned wellbore trajectory path in determining whether the actual wellbore trajectory path deviates from the planned wellbore trajectory path.

12. The computer readable medium of claim 10, wherein the operations further comprises determining a vertical shaft deflection and horizontal shaft deflection for changing the actual wellbore trajectory path to the modified correction path.

13. The computer readable medium of claim 10, wherein the real-time path data includes measured depth (MD), horizontal departure along south-north direction (X), horizontal departure along west-east direction (Y), true vertical depth (Z), inclination angle ($\alpha$), azimuth angle ($\phi$), and tool face angle.

14. The computer readable medium of claim 10, wherein the parameters of the planned wellbore trajectory path includes measured depth (MD), horizontal departure along south-north direction (X), horizontal departure along west-east direction (Y), true vertical depth (Z), inclination angle ($\alpha$), azimuth angle ($\phi$), pay zone location, and maximum dogleg severity.

15. The computer readable medium of claim 12, wherein the operations further comprises initiating a first actuator for performing the vertical shaft deflection and initiating a second actuator for performing the horizontal shaft deflection for changing the actual wellbore trajectory path to the modified correction path.

16. The computer readable medium of claim 10, wherein the minimum incremental wellbore energy method is at least one of a balanced tangential method, a minimum curvature method, and a natural curve method.

17. A proportional-integral-derivative (PID) controller for performing automated downhole wellbore trajectory control for correcting between an actual wellbore trajectory path and a planned wellbore trajectory path, the PID controller comprising:
   at least one processor; and
   at least one memory coupled to the at least one processor and storing instructions that when executed by the at least one processor performs operations comprising:
      receiving, from measurement tools coupled to a drill string disposed within a wellbore being drilled through a formation, real-time path data for determining the actual wellbore trajectory path;
      receiving parameters for the planned wellbore trajectory path;
      determining whether the actual wellbore trajectory path deviates from the planned wellbore trajectory path, based on the real-time path data and the parameters of the planned wellbore trajectory path;
      responsive to a determination that the actual wellbore trajectory path deviates from the planned wellbore trajectory path, determining whether the actual wellbore trajectory path deviates from a correction path for the wellbore;
      responsive to a determination that the actual wellbore trajectory path deviates from the correction path, determining a target point along the planned wellbore trajectory path for modifying the correction path;
      determining trajectory correction parameters for changing the actual wellbore trajectory path of the wellbore to a modified correction path having a minimum incremental wellbore energy, based on the target point, the minimum incremental wellbore energy determined by an overall angle change, a wellbore curvature, a borehole torsion, and a change in azimuth angle; and
      automatically controlling the actual wellbore trajectory path of the wellbore as it is drilled through the formation, based on the trajectory correction parameters determined for the modified correction path.

18. The PID controller of claim 17, wherein the operations further comprises:
   determining a trend angle and a deviation vector length between the actual wellbore trajectory path and the planned wellbore trajectory path in determining whether the actual wellbore trajectory path deviates from the planned wellbore trajectory path.

19. The PID controller of claim 17, wherein the operations further comprises:
   determining a vertical shaft deflection and horizontal shaft deflection for changing the actual wellbore trajectory path to the modified correction path; and
   initiating a first actuator for performing the vertical shaft deflection and initiating a second actuator for performing the horizontal shaft deflection for changing the actual wellbore trajectory path to the modified correction path.

20. The PID controller of claim 17, wherein the minimum incremental wellbore energy method is at least one of a balanced tangential method, a minimum curvature method, and a natural curve method.

* * * * *